United States Patent [19]
Arikawa

[11] Patent Number: 5,118,168
[45] Date of Patent: * Jun. 2, 1992

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[*] Notice: The portion of the term of this patent subsequent to Dec. 27, 2005 has been disclaimed.

[21] Appl. No.: 453,145

[22] Filed: Dec. 12, 1989

Related U.S. Application Data

[63] Continuation of Ser. No. 153,847, Feb. 8, 1988, abandoned.

[30] Foreign Application Priority Data

Feb. 9, 1987 [JP] Japan .............................. 62-029422
Apr. 17, 1987 [JP] Japan .............................. 62-094849

[51] Int. Cl.$^5$ .............................................. B60T 8/34
[52] U.S. Cl. ...................................... 303/111; 303/96; 303/106
[58] Field of Search .................... 308/95, 96, 97, 100, 308/103, 105, 106, 109, 110, 111; 364/426.1, 426.2; 188/181 A, 181 R, 181 C

[56] References Cited

U.S. PATENT DOCUMENTS

| | | | |
|---|---|---|---|
| 3,604,761 | 9/1971 | Okamato | 303/105 |
| 3,674,317 | 7/1972 | Mangold | 303/111 |
| 3,754,797 | 8/1973 | Rodi et al. | 188/181 C X |
| 3,797,892 | 3/1974 | Leiber | 303/106 |
| 3,877,755 | 4/1975 | Carp et al. | 303/106 |
| 3,980,346 | 9/1976 | Leiber | 188/181 A X |
| 4,005,910 | 2/1977 | Leiber et al. | 303/96 |
| 4,033,637 | 7/1977 | Leiber | 303/115 |
| 4,059,312 | 11/1977 | Jonner | 303/111 X |
| 4,229,049 | 10/1980 | Ando | 303/115 X |
| 4,418,966 | 12/1983 | Hattwig | 303/100 |
| 4,421,362 | 12/1983 | Shirai et al. | 303/115 |
| 4,435,768 | 3/1984 | Arikawa | 364/426 |
| 4,439,832 | 3/1984 | Sato et al. | 303/97 X |
| 4,451,096 | 5/1984 | Gygax | 303/109 |
| 4,637,664 | 1/1987 | Arikawa | 303/111 |
| 4,637,664 | 1/1987 | Arikawa | 303/111 |
| 4,673,226 | 6/1987 | Every et al. | 303/109 X |
| 4,740,040 | 4/1988 | Arikawa | 303/96 |
| 4,744,610 | 5/1988 | Arikawa | 303/111 X |
| 4,753,493 | 6/1988 | Arikawa | 303/110 |
| 4,776,644 | 10/1988 | Arikawa | 303/111 |
| 4,783,126 | 11/1988 | Arikawa | 303/96 |
| 4,793,662 | 12/1988 | Arikawa | 303/111 X |

FOREIGN PATENT DOCUMENTS

| | | | |
|---|---|---|---|
| 0235254 | 10/1986 | Japan | 303/111 |
| 2182109 | 5/1987 | United Kingdom | |
| 2191553 | 12/1987 | United Kingdom | |
| 2194825 | 3/1988 | United Kingdom | |

Primary Examiner—Matthew C. Graham
Attorney, Agent, or Firm—Jones, Day, Reavis & Pogue

[57] ABSTRACT

An anti-skid control apparatus for a vehicle includes fluid pressure control valve devices arranged between fluid pressure generating chambers of a tandem master cylinder and the wheel cylinders of the front wheels, respectively, and a control unit receiving outputs of wheel speed sensors for measuring or judging the skid conditions of the front and rear wheels and for generating instructions for controlling the fluid pressure control valve devices. The control unit discriminates the frictionally lower side of the road on which the wheels are running, on the basis of the measuring or judging results of the skid conditions of the rear and/or front wheels, combines logically the measuring or judging result of the skid condition of the one rear wheel running on the low side of the road or the measuring or judging results of the skid conditions of the rear wheels, with that of the one front wheel running on the low side, for generating the instruction for controlling the first or second fluid pressure control valve device for the corresponding front wheel, and generates the instruction for controlling the second or first fluid pressure control valve device for the other front wheel, on the basis of the measuring or judging result of the skid condition of the measuring or judging result of the skid condition of the other front wheel running on the high side independently of those of the rear wheels. The low side can be changed over in accordance with the measuring or judging result. Or the control unit will reset the low side.

25 Claims, 18 Drawing Sheets

FIG.7
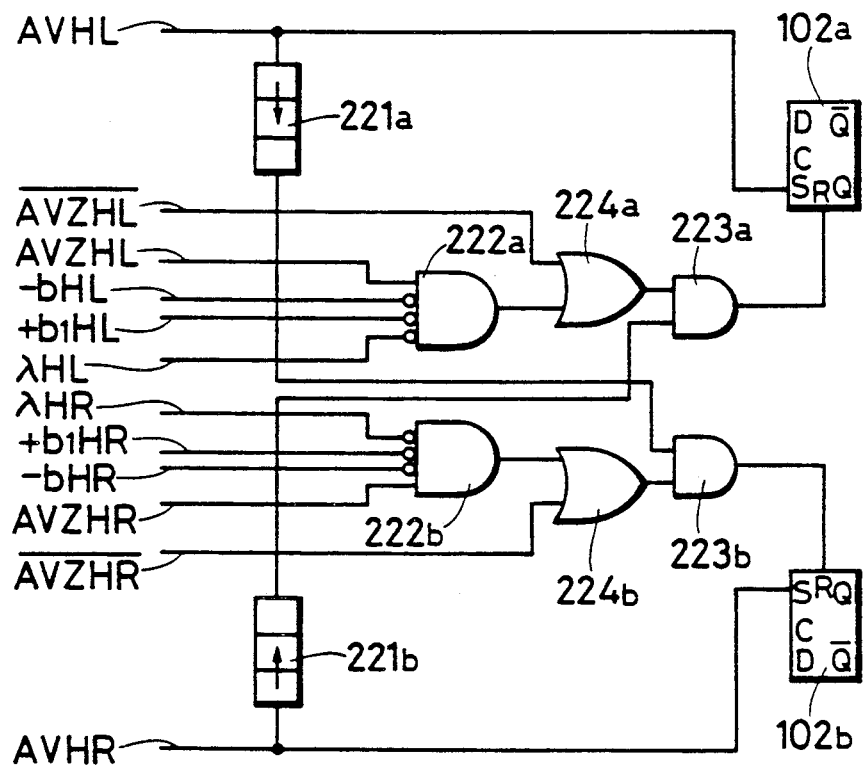
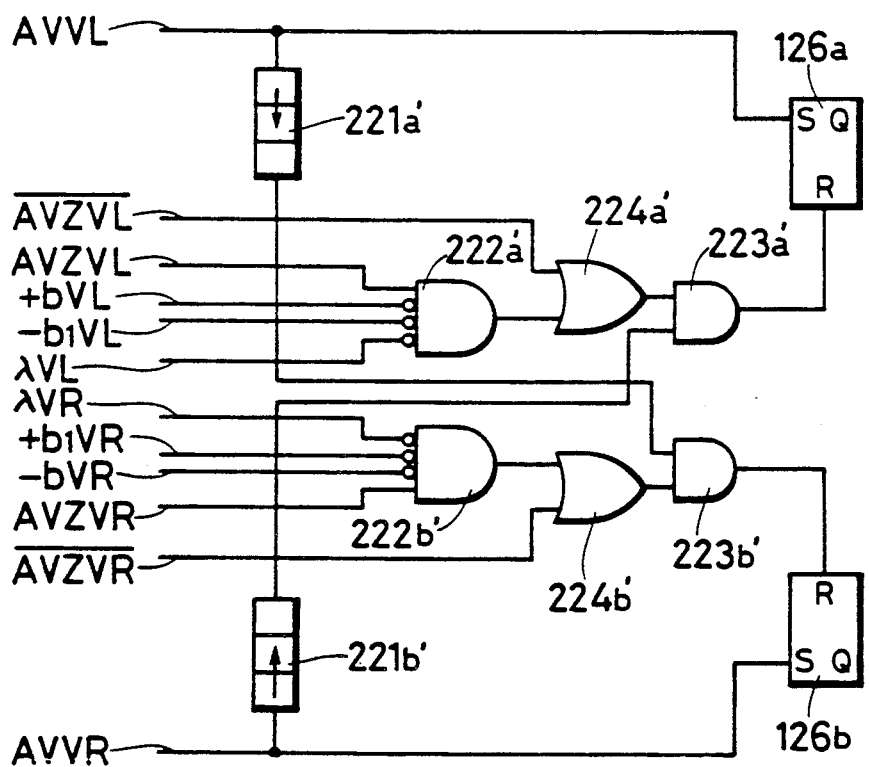

ANTI-SKID CONTROL APPARATUS FOR A VEHICLE BRAKING SYSTEM

This is a continuation of copending application Ser. No. 0/153,847 filed on Feb. 8, 1988, now abandoned.

BACKGROUND OF THE INVENTION

1. Field of the Invention

This invention relates to an anti-skid control apparatus for a vehicle braking system which can prevent the locking of the wheels.

2. Description of the Prior Art

Such an anti-skid control apparatus for a vehicle braking system is known that includes fluid pressure control valve devices arranged between fluid pressure generating chambers of a tandem master cylinder and the wheel cylinders of the front wheels, respectively, and a control unit receiving outputs of respective wheel speed sensors for measuring or judging the skid conditions of the front and rear wheels and for generating instructions for controlling the fluid pressure control valve devices.

When the fluid pressure control valve device is provided for each of four wheels (four channels), and the fluid pressure of them are independently controlled, there is no problem on control operation. Or when the fluid pressure control valve device is provided for each of front wheels, and for both of rear wheels in common (three channels), there is no problem on control operation. In the latter case, the one common fluid pressure control valve device is controlled on the basis of the lower one of the speeds of the rear wheels.

However, in the above cases, three or four fluid pressure control valve devices are used. Accordingly, the whole anti-skid control apparatus is large-sized, and very heavy. Since the fluid pressure control valve device is expensive, it requires high cost.

Further, the brake pressures of the front and rear axles can be separately controlled from each other in the four or three channels. Accordingly, when the automobile is of the so-called "four wheel drive type" (4WD), which includes at least a center differential as a torque distribution mechanism, there is the possibility that the phase difference and circulating torque will occur between the brake controls of the front and rear axles. In that case, the driver feels uncomfortable.

SUMMARY OF THE INVENTION

Accordingly, it is an object of this invention to provide an anti-skid control apparatus for a vehicle braking system which can be small-sized and light, and can be stable in steering.

In accordance with an aspect of this invention, in an anti-skid control apparatus for a vehicle braking system including: a pair of front wheels, and a pair of rear wheels; wheel speed sensors associated with said wheels, respectively; a first fluid pressure control valve device for controlling the brake fluid pressure of the wheel cylinder of one of said front wheels, arranged between a first fluid pressure generating chamber of a tandem master cylinder and said wheel cylinder of the one front wheel; a second fluid pressure control valve device for controlling the brake fluid pressure of the wheel cylinder of another of said front wheels, arranged between a second fluid pressure generating chamber of said tandem master cylinder and said wheel cylinder of the other front wheel; and a control unit receiving outputs of said wheel speed sensors for judging the skid conditions of said front and rear wheels and for generating instructions for controlling said first and second fluid pressure control valve devices, the improvements in which said control unit comprises a low-side discrimination circuit and a logic control circuit, said low-side discrimination circuit judges which side is frictionally lower between the sides of the road on which said wheels are running, from the judging results of the skid conditions of said rear and front wheels, on the basis of the outputs of said wheel speed sensors (the road side judged to be frictionally lower is designated as the "low side"), said "low side" being able to change over in accordance with said judging results at any time, said logic control circuit combines logically the judging results of the skid conditions of said rear wheels with the judging result of the skid condition of the one front wheel running on the low side for generating the instruction for controlling said first or second fluid pressure control valve device for the corresponding front wheel, and generates the instruction for controlling said second or first fluid pressure control valve device for the other front wheel, on the basis of the judging result of the skid condition of the other front wheel running on the high side (frictionally higher side) independently of those of said rear wheels.

In accordance with another aspect of this invention, in an anti-skid control apparatus for a vehicle braking system including: a pair front wheels, and a pair of rear wheels; wheel speed sensors associated with said wheels, respectively; a first fluid pressure control valve device for controlling the brake fluid pressure of the wheel cylinder of one of said front wheels, arranged between a first fluid pressure generating chamber of a tandem master cylinder and said wheel cylinder of the one front wheel; a second fluid pressure control valve device for controlling the brake fluid pressure of the wheel cylinder of another of said front wheels, arranged between a second fluid pressure generating chamber of said tandem master cylinder and said wheel cylinder of the other front wheel; and a control unit receiving outputs of said wheel speed sensors for judging the skid conditions of said front and rear wheels and for generating instructions for controlling said first and second fluid pressure control valve devices; the improvements in which said control unit comprises a low-side discrimination circuit and a logic control circuit, said low-side discrimination circuit judges which side is frictionally lower between the sides of the road on which said wheels are running, from the judging results of the skid conditions of said rear and front wheels, on the basis of the output of said wheel speed sensors (the road side judged to be frictionally lower is designated as the "low side"), the discrimination to be "low side" being reset in accordance with said judging results, and said logic circuit combines logically the judging result of the skid condition of the one rear wheel running on said low side of the road, with that of the one front wheel running on the same side as said low side, for generating the instruction for controlling said first or second fluid pressure control valve device for the corresponding front wheel, and generates the instruction for controlling said second or first fluid pressure control valve device for the other front wheel, on the basis of the judging result of the skid condition of the other front wheel running on the high side (frictionally higher side) independently of those of said rear wheels, or combines logically the judging results of the skid conditions of said rear wheels with the judging result of the skid condition of the one front wheel running on the low side for generating the instruction for controlling said first or second fluid pressure control valve device for the corresponding front wheel, and generates the instruction for controlling said second or first fluid pressure control valve device for the other front wheel, on the basis of the judging result of the skid condition of the other front wheel running on the high side (frictionally higher side) independently of those of said rear wheels.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 7 is a circuit diagram of an important part of a first modification of the logic circuit of FIG. 5;

DESCRIPTION OF THE PREFERRED EMBODIMENTS

Figure 1:
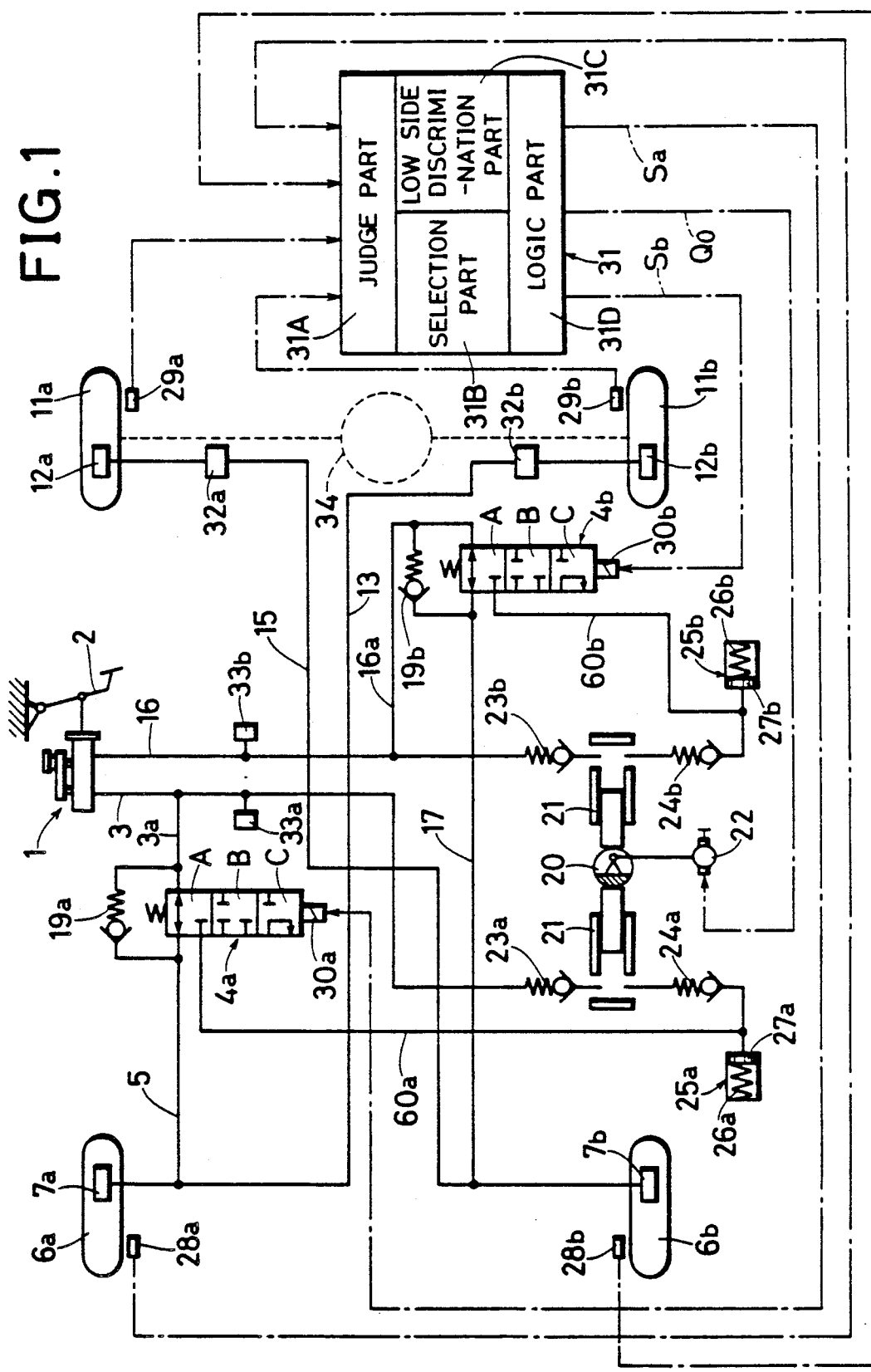
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic three position valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16. _ electro-magnetic three position valve device 4b and a conduit 17. The conduit 17 is further connected to a wheel cylinder 12a of a right rear wheel 11a through a conduit 15 and a proportional valve 32a.

Discharge openings of the valves 4a and 4b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons unnumbered, and check valves 23a, 23b, 24a, 24b. Supply openings of the fluid pressure pump 20, or the sides of the check valves 23a and 23b are connected to the conduits 3 and 16, respectively.

Dumpers 33a and 33b are further connected to the conduits 3 and 16 at the discharging sides of the pump 20. The dumpers 33a and 33b will ensure that the pulsation of the pump 20 is not negatively transmitted to the master cylinder 1.

The wheel speed sensors 28a, 28b, 29a and 29b are associated with the wheels 6a, 6b, 11a and 11b, respectively and they generate pulse signals having frequencies proportional to the rotational speeds of the wheels 6a, 6b, 11a and 11b. The pulse signals of the wheel speed sensors are supplied to a control unit 31 according to this invention.

Although described hereinafter in detail, the control unit 31 consists of a judge part 31A, a selection part 31B, a low side discrimination part 31C and a logic part 31D. Output terminals of the wheels speed sensors 28a, 28b, 29a and 29b are connected to input terminals of the judge part 31A. The judge part 31A receives the wheel speed signals, judges them and supplies the results to the selection part 31B, the discrimination part 31C and the logic part 31D. As will be hereinafter described, the outputs of the selection part 31B and the judge part 31A are logically combined with each other in the logic part 31D. Control signals Sa and Sb, and motor drive signals Qo, as the calculation or measurement results are generated from the control unit 31, and are supplied to solenoid portions 30a and 30b of the valve devices 4a and 4b and motor 22, respectively. Dash lines represent electric lead wires.

Although schematically shown, the electro-magnetic valves devices 4a and 4b have well-known constructions.

The valve devices 4a and 4b take anyone of three positions A, B and C in accordance with the current intensities of the control signals Sa and Sb.

When the control signals Sa and Sb are "0" in current level, the valve devices 4a and 4b take the first position A for increasing the brake pressure to the brake for the wheel, respectively. In the first position A, the master cylinder side and the wheel cylinder side are made to communicate with each. When the control signals Sa and Sb are "½" in current level, the valve devices 4a and 4b take second position B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in current level, the valve devices 4a and 4b take third position C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b, 12a and 12b.

The control unit 31 further generates the drive signal Qo for the motor 22. When anyone of the control signals Sa and Sb becomes initially "1", the drive signal Qo is generated, and it is kept during the skid control operation. The drive signal Qo is supplied to the motor 22.

A differential gear mechanism 34 is arranged in the rear axle as shown by the dash-lines in FIG. 1, which combines the rear wheels 11a and 11b. Thus, the automobile of this embodiment is a rear-drive car.

In FIG. 1, check valves 19a and 19b are connected in parallel with the electro-magnetic valve devices 4a and 4b. They permit brake fluid to flow only in the direction for the wheel cylinder side towards the master cylinder side. Both sides of the valve devices 4a and 4b communicate with each other through throttling holes in position A. Accordingly, pressurized fluid is rapidly returned through the check valves 19a and 19b to the master cylinder 1 from the wheel cylinders 7a, 7b, 12a and 12b, when the brake pedal 2 is released.

Or when the brake pedal 2 is released from treading in the position B or position C of the valve devices 4a and 4b during the skid control, the brake fluid can be returned from the wheel cylinder side to the master cylinder side through the check valves 19a and 19b.

The pressure reducing proportional valves 32a and 32b have the well-known constructions. When the fluid pressure at the input side becomes higher than a predetermined value, it is reduced at a predetermined rate and transmitted to the output side.

Next, the details of the judge part 31A in the control unit 31 will be described with reference to FIG. 2.

The judge part 31A receives the outputs of the sensors 28a, 28b, 29a, 29b to judge the skid conditions of the wheels 6a, 6b, 11a, 11b. The judge circuits for the respective wheels 6a, 6b, 11a, 11b are the same in construction. FIG. 2 shows only the judge circuit for the right front wheel 6a. It will be representatively described hereinafter. However, it is partially in common with the judge circuit for the left rear wheel 11b of the same conduit system. Accordingly, only a part of the judge circuit for the left rear wheel 11b is shown in FIG. 2. The signals from the wheel speed sensors 28a and 29b are supplied to wheel speed signal generators 61a and 61b. Digital or analogue outputs proportional to the wheel speeds are obtained from the wheel speed signal generator 61a and 61b and they are supplied to differentiators 62a, 62b, slip signal generators 72a, 72b and a slip ratio setting circuit 69. In the judge circuits for the front and rear wheels 6a and 11b, the slip ratio setting circuit 69 is in common for the front and rear wheels 6a and 11b, which also share the same or common conduit system. It consists of an approximate vehicle speed signal generator 66 and multipliers 67 and 68. The higher of the outputs of the wheel speed signal generators 61a and 61b is selected, and an approximate vehicle speed signal is formed on the basis of the higher output, in the approximate vehicle speed signal generator 66. For example, multiplier numbers 0.85 and 0.70 are set in the multipliers 67 and 68, respectively. Output terminals of the slip ratio setting circuit 69 are connected to change-over circuits 70a and 70b. In the circuits 70a and 70b, movable contacts are normally connected to the output sides of the multiplier 68. Output terminals of the change-over circuits 70a and 70b are connected to the slip signal generators 72a, 72b. The outputs of the change-over circuits 70a and 70b, therefore, the values of (the approximate vehicle speed x the output 0.85 or 0.70 of the multiplier 67 or 68) are compared with the wheel speeds as the outputs of the wheel speed signal generators 61a and 61b, in the slip signal generators 72a and 72b. When the former are less than the latter, the slip signal generators 72a and 72b generate slip signals λ. Since the judge circuits are the same for the left rear wheel 11b and right front wheel 6a, hereinafter only the judge circuit for the right front wheel 6a will be described.

The differentiator 62a receives the output of the wheel speed signal generator 61a and differentiates it with respect to time. The output of the differentiator 62a is supplied to a deceleration signal generator 63a, and to first and second acceleration signal generators 64a and 65a. A predetermined threshold deceleration (for example, $-1.4$ g) is set in the deceleration signal generator 63a, and it is compared with the output of the differentiator 62a. Predetermined threshold accelerations (for example, 0.5 g and 7 g) are set in the first and second acceleration signal generators 64a and 65a, respectively and they are compared with the output of the differentiator 62a. When the deceleration of the wheel becomes larger than the predetermined threshold deceleration ($-1.4$ g), a deceleration signal $-b$ is generated from the deceleration signal generator 63a. When the acceleration of the wheel becomes larger than the predetermined threshold acceleration (0.5 g) or (7 g), an acceleration signal $+b_1$ or $+b_2$ is generated from the acceleration signal generator 64a or 65b.

An output terminal of the first acceleration signal generator 64a is connected to negation input terminals (indicated by circle 0) of AND gates 73a, 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator U is constituted by the acceleration signal generator 64a, the pulse generator 80a, the OR gate 82a, and the AND gate 81a, and it generates pulse signals to slowly increase the brake pressure. The width of the first pulse is so designed as to be larger than that of the subsequent pulses in the pulse generator 80a. Thus, insufficiency of the braking force is prevented.

The output terminal of the deceleration signal generator 63a is connected to a second input terminal of the OR gate 82a. The output terminal of the AND gate 81a is connected to the third input terminal of the OR gate 82a. The output terminal of the slip signal generator 72a is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a is connected to one input terminal of the AND gate 75a and an output terminal of an OFF delay timer 86a is connected to another input terminal of the AND gate 75a. The delay time of the OFF delay timer 86a is sufficiently long. Once the output of the OFF delay timer 86a becomes "1", it is maintained during the anti-skid control operation. An output terminal of the OR gate 76a is connected to an input terminal of the OFF delay timer 86a, and further connected to one input terminal of an OR gate 87a. The output terminal of the OFF delay timer 86a is connected to another negation input terminal of the OR gate 87a.

An output terminal of the OR gate 87a is connected to one input terminal of a counter 88a, and the output terminal of the AND gate 81a of the stepwise brake-increasing signal generator U is connected to another input terminal of the counter 88a. Pulses from the AND gate 81a are counted by the counter 88a. When the counted number reaches a predetermined number, the output of the counter 88a becomes "1". And when the output of the OR gate 87a becomes "1", the content of the counter 88a is reset.

The output terminals of the deceleration signal generator 63a, first acceleration signal generator 64a, and pulse signal generator 80a are further connected to the respective input terminals of an OR gate 71a. The change-over circuit 70a is changed over by the output of the OR gate 71a. When the output of the OR gate 71a becomes "1", the movable contact of the change-over circuit 70a is changed over to the output side of the multiplier 67.

The output terminal of the OR gate 82a is connected to one input terminal of an AND gate 83a, and the output terminal of the second acceleration signal generator 65a is connected to another negation input terminal of the AND gate 83a. The output terminal of the AND gate 83a is connected to one input terminal of an AND gate 84a and OR gate 85a. The output terminal of the OR gate 76a is connected to another negation input terminal of the AND gate 84a and to another input terminal of the OR gate 85a.

The output terminal of the AND gate 75a is connected to an OFF delay timer 77a. The output terminal thereof is connected to a fourth input terminal of the OR gate 82a, another OFF delay timer 131a and further a negation input terminal of an AND gate 130a. The output terminal of the OFF delay timer 131a is connected to another input terminal of the AND gate 130a.

The judge circuit for the right front wheel 6a is constructed as above described. Ten kinds of signals are sent from this circuit. They will be denominated as shown in the right end of FIG. 2. The output signal of the second acceleration signal generator 65a is denominated as $+b_2VR$, that of the first accelerator signal generator 64a as $+b_1VR$, that of the AND gate 84a as EVVR, those of the OR gates 85a and 76a as EAVR and AVVR, respectively, that of the OFF delay timer 86a as AVZVR, that of the counter 88a as CEVR, that of the deceleration signal generator 63a as $-bVR$, that of the AND gate 81a as PLVR, and that of the slip signal generator 72a as $\lambda VR$, where the letter "V" means "front side", and the letter "R" means "right side".

The judge circuits for the left rear wheel 11b, the left front wheel 6b and the right rear wheel 11a are constructed in the similar manner, respectively. The ten kinds of signals $+b_2HL$, $+b_1HL$, EVHL, EAHL, AVZHL, AVHL, CEHL, PLHL, $-bHL$ and $\lambda HL$ are taken out from the judge circuit for the left rear wheel 11b, where the letter "H" means "rear side" and the letter "L" means "left side". Similarly $+b_2VL$, $+b_1VL$, EVVL, EAVL, AVZVL, AVVL, CEVL, PLVL, $-bVL$ and $\lambda VL$, and $+b_2HR$, $+b_1HR$, EVHR, EAHR, AVZHR, AVHR, CEHR, PLHR, $-bHR$ and $\lambda HR$ are taken out from the judge circuits for the left front wheel 6b and the right rear wheel 11a, respectively.

Next, the details of the selection part 31B of the control unit 31 will be described with reference to FIG. 3.

The selection part 31B is constructed symmetrically with respect to the rear wheels 11a and 11b. The output EVHR, EVHL, $\overline{AVZHR}$, $\overline{AVZHL}$ (negations of the AVZHR, AVZHL, respectively), CEHR, CEHL, AVHR, AVHL, EAHR and EAHL from the judge part 31A are supplied to the selection part 31B. The output signals EVHR and EVHL are supplied to one input terminals of AND gates 90a and 90b, respectively and input terminals of an OR gate 93. The output signals $\overline{AVZHR}$ and $\overline{AVZHL}$ are supplied to one input terminals of OR gate 91a and 91b, respectively. The output signals CEHR and CEHL are supplied to other input terminals of the OR gates 91a and 91b. Output terminals of OR gates 91a and 91b are connected to reset terminals $R_1$ and $R_2$ of flip-flops 89a and 89b, respectively.

The flip-flops 89a and 89b are of the D-type. The output signals AVHR and AVHL are supplied to set terminals $S_1$ and $S_2$ of the flip flops 89a and 89b, and they are further supplied to an OR gate 96.

The output signals EAHR and EAHL are negated, and then supplied to clock terminals $C_1$ and $C_2$ of the flip-flops 89a and 89b. Output terminals $Q_1$ and $Q_2$ of the flip-flops 89a and 89b are connected to other input terminals of the AND gate 90a and 90b. Negation output terminals $\overline{Q_1}$ and $\overline{Q_2}$ are connected to data terminals $D_2$ and $D_1$ of the flip-flops 89b and 89a, and further they are connected to input terminals of the AND gate 92. An output terminal of the OR gate 93 is connected to the remaining one input terminal of the AND gate 92. Output terminals of the AND gates 90a, 90b and 92 are connected to input terminals of the OR gate 94, respectively. An output terminal of the OR gate 94 is connected to one input terminal of the AND gate 95. An output terminal of the OR gate 96 is connected to another negation input terminal of the AND gate 95. Output terminals of the AND gate 95 and OR gate 96 are connected to input terminals of the OR gate 97, respectively.

An output "f" of the AND gate 95 is denominated as EVH, that "g" of the OR gate 97 as EAH, and that "e" of the OR gate 96 as AVH. They are supplied to the subsequent logic part 31D. Thus, first select-low control signals EVH, EAH and AVH are formed from the judge results of the skid conditions of both of the rear wheels 11a and 11b.

Next, the low-side discrimination part 31C of the control unit 31 will be described in detail with reference to FIG. 4.

The low-side discrimination part 31C consists of a rear wheel side discrimination part 31C and a front wheel side discrimination part $31C_1$ which are independent of each other. On basis of the brake holding signals EVVR, EVVL, EVHR and EVHL from the wheels, any of the discrimination parts $31C_1$ and $31C_2$ discriminate which side is a frictionally lower side of the sides of the road on which the vehicle runs. In the rear wheel side discrimination part 31C$_1$, the output signals EVHR and EVHL are supplied to one negation input terminals of AND gates 98a and 98b. Further, they are supplied to other input terminals of the AND gates 98b and 98a. Output terminals of the AND gates 98a and 98b are connected to a set terminal S of a flip-flop 100 and a reset terminal R thereof. Output Q thereof is supplied as a signal SLAH to the subsequent logic part 31D.

The front wheel side discrimination part 31C$_2$ is similarly constructed. It consists of AND gates 98a', 98b' and a flip-flop 100'. The brake holding signals EVVR and EVVL from the front wheels are supplied to the front wheel side discrimination part 31C$_2$. Output Q of the flip-flop 100' is supplied as a signal SLAV to the subsequent logic part 31D.

Next, the logic part 31D of the control unit 31 will be described in detail with reference to FIG. 5. The logic part 31D is constructed in nearly symmetrical manner with respect to the right and left wheels.

The input signals CEVL, CEVR, AVZVL, AVZVR, EVVL, EVVR, AVVL, AVVR, EAVL, EAVR, CEHL, CEHR, AVHL, AVHR, PLHL, PLHR, PLVL and PLVR are supplied from the judge part 31A. And the input signals EVH, AVH, EAH and SLAV, SLAH are supplied from the selection part 31B and the low side discrimination part 31C, respectively.

The signals CEVL and CEVR are supplied to one input terminals of OR gates 105a and 105b. The signals AVZVL and AVZVR are supplied to another negation input terminals of the OR gate 105a and 105b. Output terminals of the OR gates 105a and 105b are connected to reset terminals of flip-flops 101a and 101b. The signals EVVL and EVVR are supplied to one input terminals of AND gates 103a, 103b and OR gates 107a and 107b.

The signals AVVL and AVVR are supplied to set terminals S of the flip-flops 101a and 101b, and one input terminals of OR gates 111a and 111b. The signals EAVL and EAVR are negated and then supplied to clock terminals C of the flip-flops 101a and 101b. Output terminals Q of the flip-flops 101a and 101b are connected to other input terminals of the AND gates 103a and 103b. $\overline{Q}$ terminals of the flip-flops 101a and 101b are connected to first input terminals of AND gates 108a and 108b, and further to data terminals D of other flip-flops 102a and 102b. Similarly, $\overline{Q}$ terminals of the flip-flops 102a and 102b are connected to data terminals D of the other flip-flops 101a and 101b, and they are connected to third input terminals of the AND gates 108a and 108b. Output terminals of the OR gates 107a and 107b are connected to second input terminals of the AND gates 108a and 108b.

The signals AVHL and AVHR are supplied to set terminals S of the flip-flops 102a and 102b. Q output terminals of the flip-flops 102a and 102b are connected through OR gates 121a, 121b to one input terminals of AND gates 104a, 104b and 112a and 112b. Further, they are connected through the OR gates 121a, 121b to third input terminals of the OR gates 106b and 106b. Output terminals of the AND gates 104a and 104b are connected to third input terminals of OR gates 109a and 109b. Output terminals of the AND gates 103a, 103b and 108a, 108b are connected to first and second input terminals thereof, respectively.

Output terminals of the AND gates 112a and 112b are connected to other input terminals of the OR gates 111a and 111b. Output terminals of the OR gates 109a, 109b and 111a, 111b are connected to one input terminals of AND gates 110a and 110b, and to other negation input terminals thereof.

The signals AVHL and AVHR are further connected to third input terminals of AND gates 113b and 113a. The signals PLHL, PLVL and PLHR, PLVR are supplied to first and second input terminals of the AND gates 113a and 113b, respectively. Output terminals of the AND gates 113a and 113b are connected to second input terminals of the OR gates 106a and 106b. The signals CEHL and CEHR are supplied to first input terminals of the OR gates 106a and 106b.

The signal EVH is supplied to one input terminals of AND gates 114a and 114b, and output terminals of the gates 114a and 114b are connected to one input terminals of OR gates 122a and 122b, respectively. Further, output terminals of the gates 122a and 122b are connected to the other input terminals of the OR gates 107a and 107b. The signal SLAH is supplied to another input terminal of AND gate 114a, while the signal SLAH is negated, and then supplied to another input terminal of the other AND gate 114b. The signal AVH is supplied to other input terminals of the AND gates 112a and 112b. The signal EAH is negated and then supplied to clock terminals C of the flip-flops 102a and 102b.

The signal SLAV is supplied to one input terminal of AND gate 123a and it is negated and supplied to one input terminal of another AND gate 123b. Output terminals of AND gates 127a and 127b are connected to other input terminals of the AND gates 123a and 123b. The signals EVVL and EVVR are supplied to one input terminals of the AND gates 127a, 127b and a signal AVZ (to be described hereinafter) is negated and supplied to other input terminals of the AND gates 127a and 127b.

The above signals PLVL, PLHL and AVVR are further supplied to AND gate 124a. The signals PLHR, PLVR and AVVL are supplied to AND gate 124b. Output terminals of the AND gates 124a and 124b are connected to second input terminals of OR gates 125a and 125b. The above signals CEVL, CEVR and outputs of OR gates 121a and 121b are supplied to the first and third input terminals of the OR gates 125a and 125b, respectively. Output terminals of the OR gates 125a and 125b are connected to reset terminals R of third flip-flops 126a and 126b. The above signals AVVL and AVVR are supplied to set terminals S of the flip-flops 126a and 126b. Q outputs of the flip-flops 126a and 126b are supplied to other input terminals of the OR gates 121a and 121b.

In the above-described manner, the first select-low control signals from the selection part 31B are logically combined with the judge results of the front wheel running on the frictionally low side of the road, to form second select-low control signals as outputs of the logic part 31D.

Output signals EV' and EV of the AND gates 110a and 110b at the last stage of the logic part 31D correspond to the control signals Sb, Sa of the current level "½", and are supplied to the solenoid portion 30b and 30a of the change-over valves 4b and 4a in FIG. 1, respectively. Output signals AV' and AV of the OR gates 111a and 111b at last stage of the logic part 31C correspond to the control signals Sb, Sa of the current level "1", and are supplied to the solenoid portions 30b and 30a of the change-over valves 4b and 4a in FIG. 1, respectively.

The logic part 31D further includes a motor drive circuit. It consists of OFF-delay timers 8a and 8b, an OR gate 145 and an amplifier 146 connected to an output terminal of the OR gate 145. The output signals AV and AV' are supplied to input terminals of the OFF-delay timers 8a, 8b. An output Qo of the amplifier 146 is supplied to the motor 22 in FIG. 1. The output AVZ of the OR gate 145 has been described above.

Further, according to this embodiment, the signals from the wheel speed sensors 28a, 28b, 29a and 29b are judged or measured every predetermined time segment or time-sharingly in the control unit 31. For example, the signals are judged or measured in the order of the signals respectively from the sensors 28b - 28a - 29b - 29a - 28b.

Accordingly, even when the right and left wheel speeds or the front and rear wheel speeds equally change at the same time, the same signals are not generated from the left and right wheels or the front and rear wheels. Thus, the signals can be processed by an electronic computer.

Next, there will be described operations of the above described anti-skid apparatus.

It is not assumed that the wheels 6a, 6b, 11a and 11b run on the road which is uniform in frictional coefficient. The vehicle driver treads the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3, 16, the valves devices 4a, 4b and the conduits 5, 17. Further, fluid is supplied to the wheel cylinders 12a and 12b of the rear wheels 11a and 11b through the conduits 13 and 15 and the proportioning valves 51a and 51b. Thus, the wheels 6a, 6b, 11a and 11b are braked.

Now it is assumed that the frictional coefficient of the right side is smaller (low side). The brake pedal 2 is trodden. At time t1, the right rear wheel 11b reaches the predetermined deceleration, and so the signal $-b$ is generated from the deceleration signal generator corresponding to the deceleration signal generator 63a of FIG. 2 in the judge circuit for the right rear wheel 11a. Although FIG. 2 shows the judge circuit for the right front wheel 11a, the same reference symbols will be hereinafter used for the corresponding elements or circuit blocks for the convenience of the description.

The signal $-b$ is supplied to the OR gate 71a, and the movable contact of the change-over circuit 70a is changed over to the output side of the multiplier 67, by the output of the OR gate 71a. The signal $-b$ is further supplied to the third input terminal of the OR gate 82a. The output of the OR gate 82a generates the output signal EVHR through the AND gates 83a and 84a, and further the output signal EAHR through the OR gate 85a.

Figure 6:
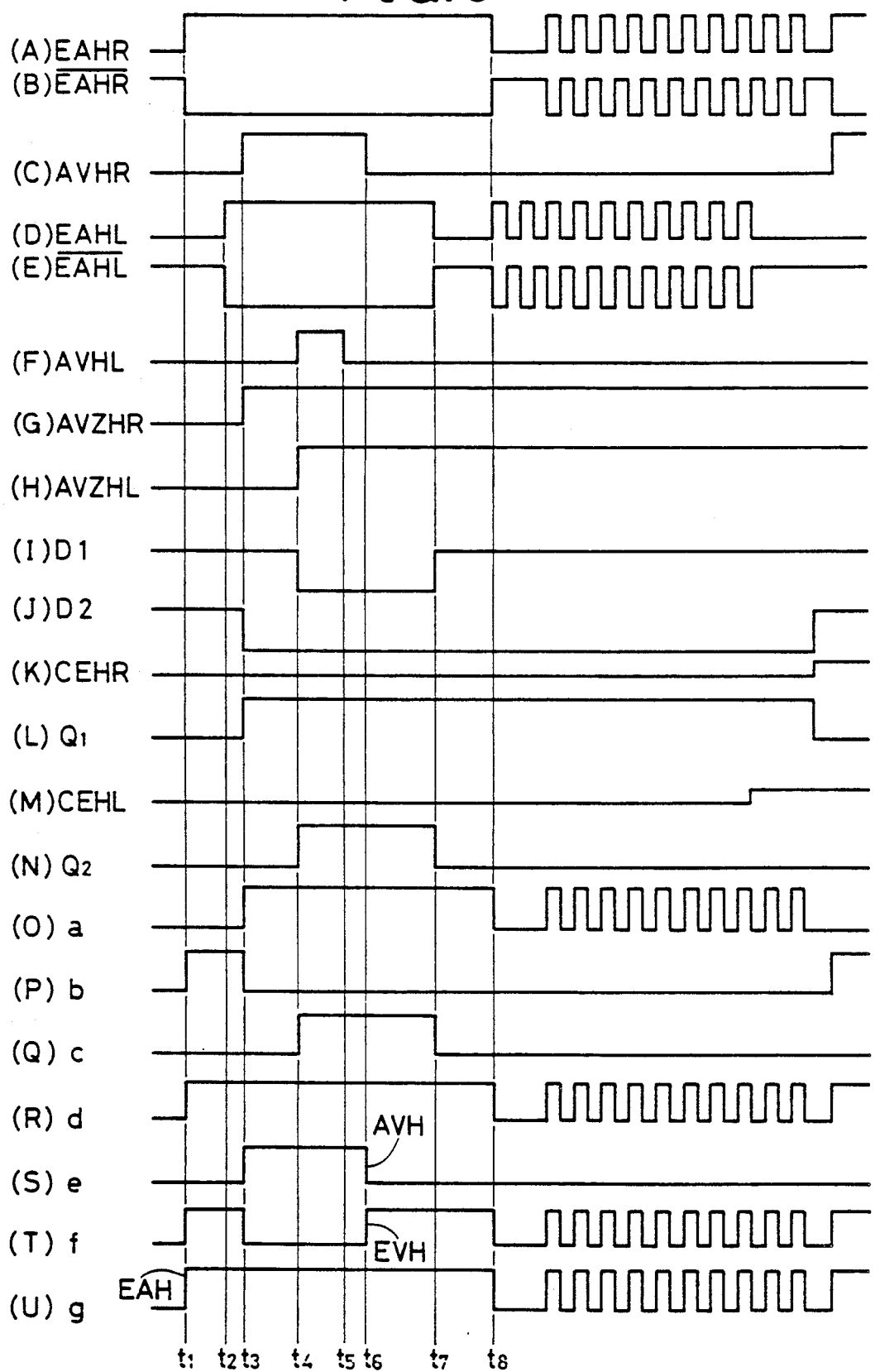
FIG. 6 is a graph for explaining operations of the first embodiment of this invention.

As shown in FIG. 6(A), the signal EAHR becomes "1" at time t1. In FIG. 3, the $\bar{Q}_1$, $\bar{Q}_2$ outputs of the flip-flops 89a and 89b are "1", and the signal EVHR is now supplied to the AND gate 92. Accordingly, the output "b" of the AND gate 92 becomes "1", and so both of the outputs "d" and "f" of the OR gate 94 and AND gate 95 become "1". Thus, the signal EVH becomes "1". Thus, at time t1, the outputs "b", "d" and "f" becomes "1", as shown in FIG. 6 (P), (R) and (T). Accordingly, the output "g" of the OR gate 97 becomes "1". Thus, the signal EAH becomes "1", in FIG. 3.

Figure 4:
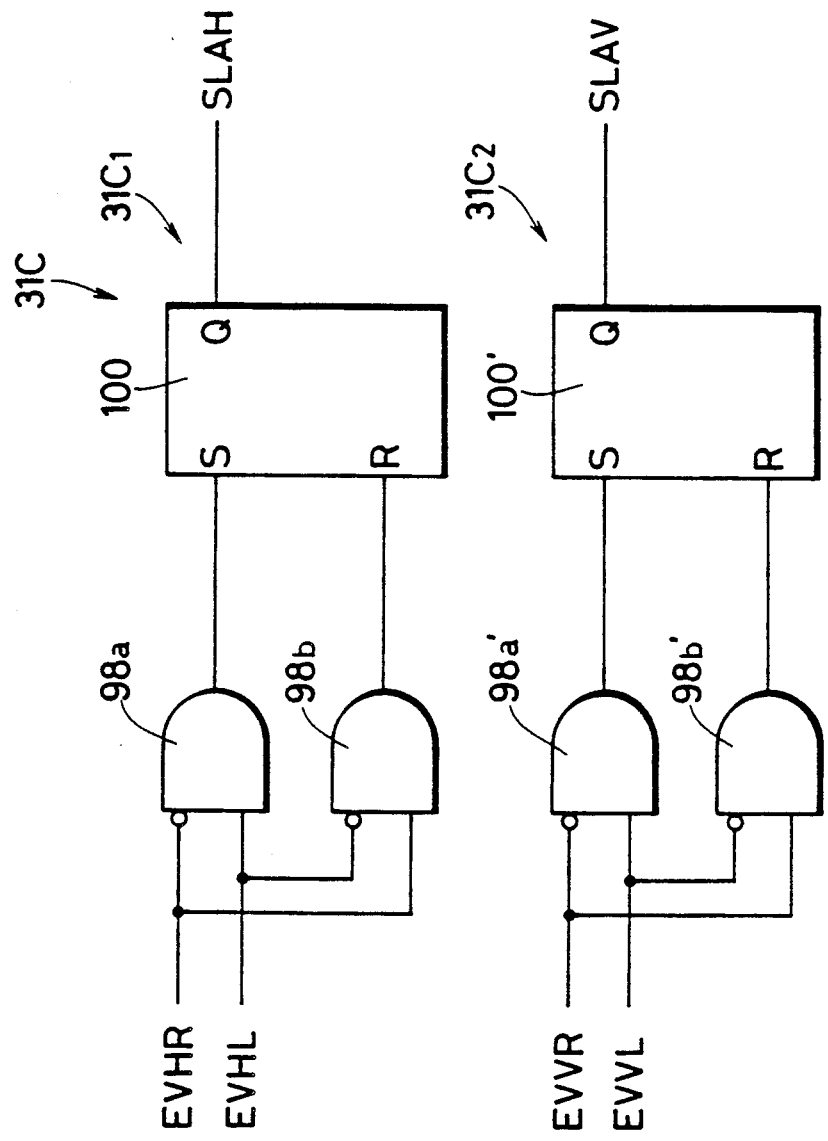
FIG. 4 is a circuit diagram of a low-side discrimination part 31C of the control unit 31 in FIG. 1.

Further, in FIG. 4, the signal EVHR is supplied to the AND gates 98a and 98b. Since the signal EVHL is still "0", the output of the AND gate 98b becomes "1", while that of the other AND gate 98a remains "0". Accordingly, the signal SLAH remains "0". The right side of the road is judged to be "low side", by that fact.

The brake holding signals EVVR and EVVL are not yet generated from the front wheels 6a and 6b. Accordingly in FIG. 4, Q output of the flip-flop 100', or the signal SLAV, remains "0". Thus, there is no problem on the fact that the right side of the road is judged to be low side.

However, when the left side of the road is low side and the brake holding signal EVHL is generated from the left rear wheel 11b, the signal SLAH becomes "1" and the signal SLAV remains "0". Thus, when the signals SLAV and/or SLAH becomes "1", the left side of the road is judged to be low side. The logic part 31D of FIG. 5 is so constructed as to be adapted to the above condition.

Figure 5:
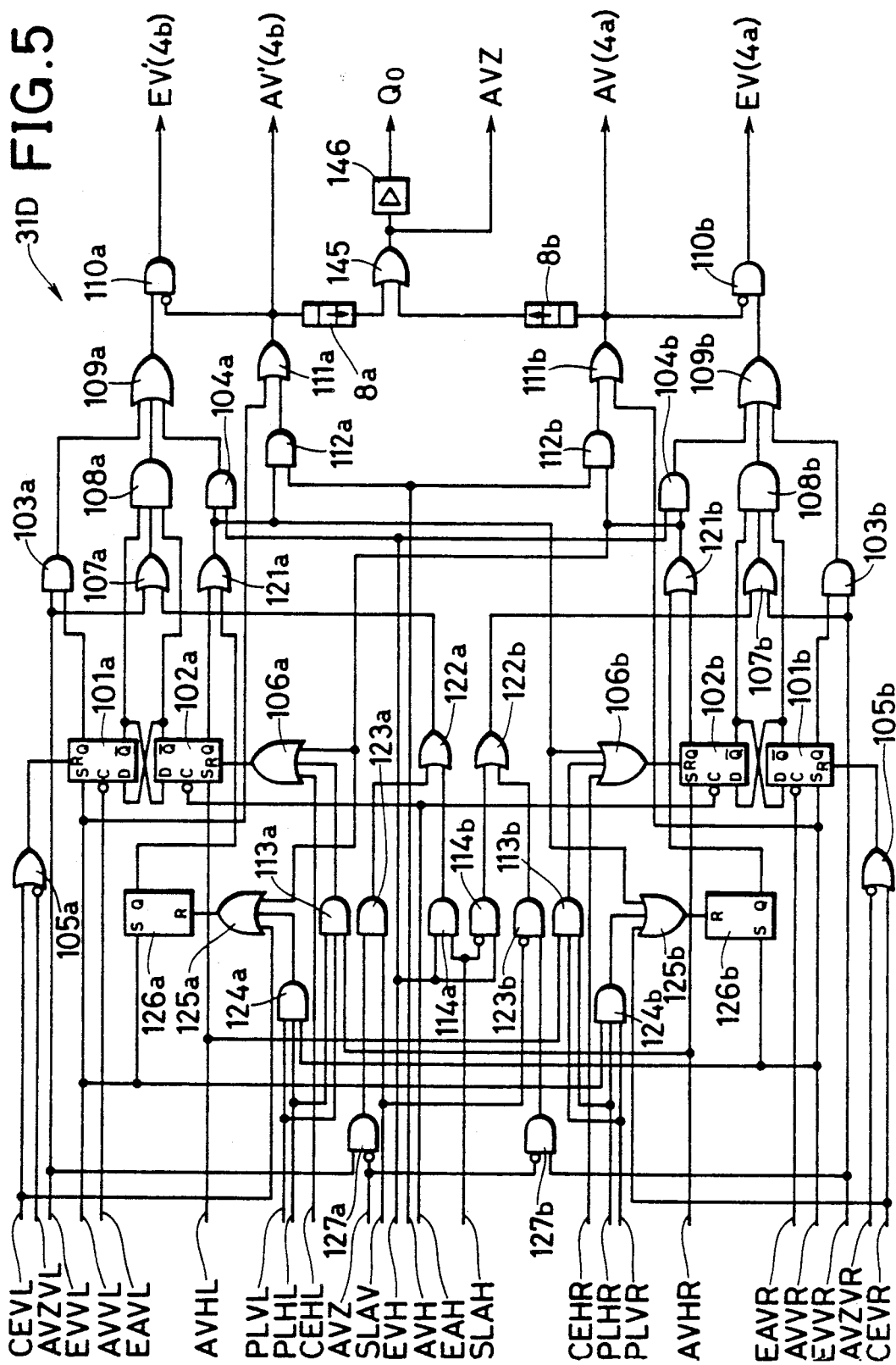
FIG. 5 is a circuit diagram of a logic part 31D of the control unit 31 in FIG. 1.

In FIG. 5, the signal EVH is supplied to the one input terminal of the AND gate 104a. However, since the Q output of the flip-flop 102a to the other input terminal of the AND gate 104a is still "0", the output of the AND gate 104a is "0". The signal EVH is also supplied to the input terminal of the AND gate 104b. However, since the Q output of the flip-flop 102b is similarly "0", the output of the AND gate 104b is also "0".

The signal EAH is supplied to the negation clock terminals C of the flip-flops 102a and 102b. However, since it is negated, the Q outputs of the flip-flops 102a and 102b remain "0".

The signal SLAH is supplied to AND gates 114a, 114b, and it is now "0". The negated signal SLAH is supplied to the AND gate 114b. Accordingly, the output of the AND gate 114b becomes "1", and therefore, the output of the OR gate 107b becomes "1". The input to the second input terminal of the AND gate 108b becomes "1". Since the Q outputs of the flip-flops 101b and 102b are "1", the output of the AND gate 108b becomes "1". The output of the OR gate 109b, and therefore that of the AND gate 110b, becomes "1". Thus, the output signal EV becomes "1". Accordingly, the control signal Sa of the current level "½" is supplied to the solenoid portion 30a of the change-over valve 4a. Thus, the braking forces to the right front wheel 6a and left rear wheels 11b are maintained at constant.

At time t2, the rear wheel 11b on the "high side" of the road reaches the predetermined deceleration. As shown in FIG. 6(d), the signal EVHL is therefore generated and is supplied to the other input terminal of the OR gate 93. The signal EVHR is already supplied to the other input terminal of the OR gate 93. Since it is maintained, the output of the OR gate 93, therefore, that "b" of the AND gate 92, that "d" of the OR gate 94, and the output signals EVH and EAH are unchanged as "1", as shown in FIG. 6 (D)(R)(T)(U). The output of the AND gate 98b becomes "0". However, the output of the other AND gate 98a remains "0". Accordingly, the Q output of the flip-flop 100 remains "0". Thus, the right side of the road is judged to be still the "low side".

At time t3, the right rear wheel 11a generates the signal AVHR as shown in FIG. 6(C). It reaches the predetermined slip. The slip signal λ is generated from the slip signal generator 72a of the judge circuit for the right rear wheel 11a. It is supplied to the one input terminal of the AND gate 73a. Since the first acceleration signal $+b_1$ is not generated, the output of the AND gate 73a becomes "1". Thus, the signal AVHR is generated. At the same time, the output of the AND gate 84a or signal EVHR becomes "0". However, the output of the OR gate 85a or the signal EAHR continues to be "1", as shown in FIG. 6(A). In FIG. 4, the signal SLAH remains "0".

Figure 2:
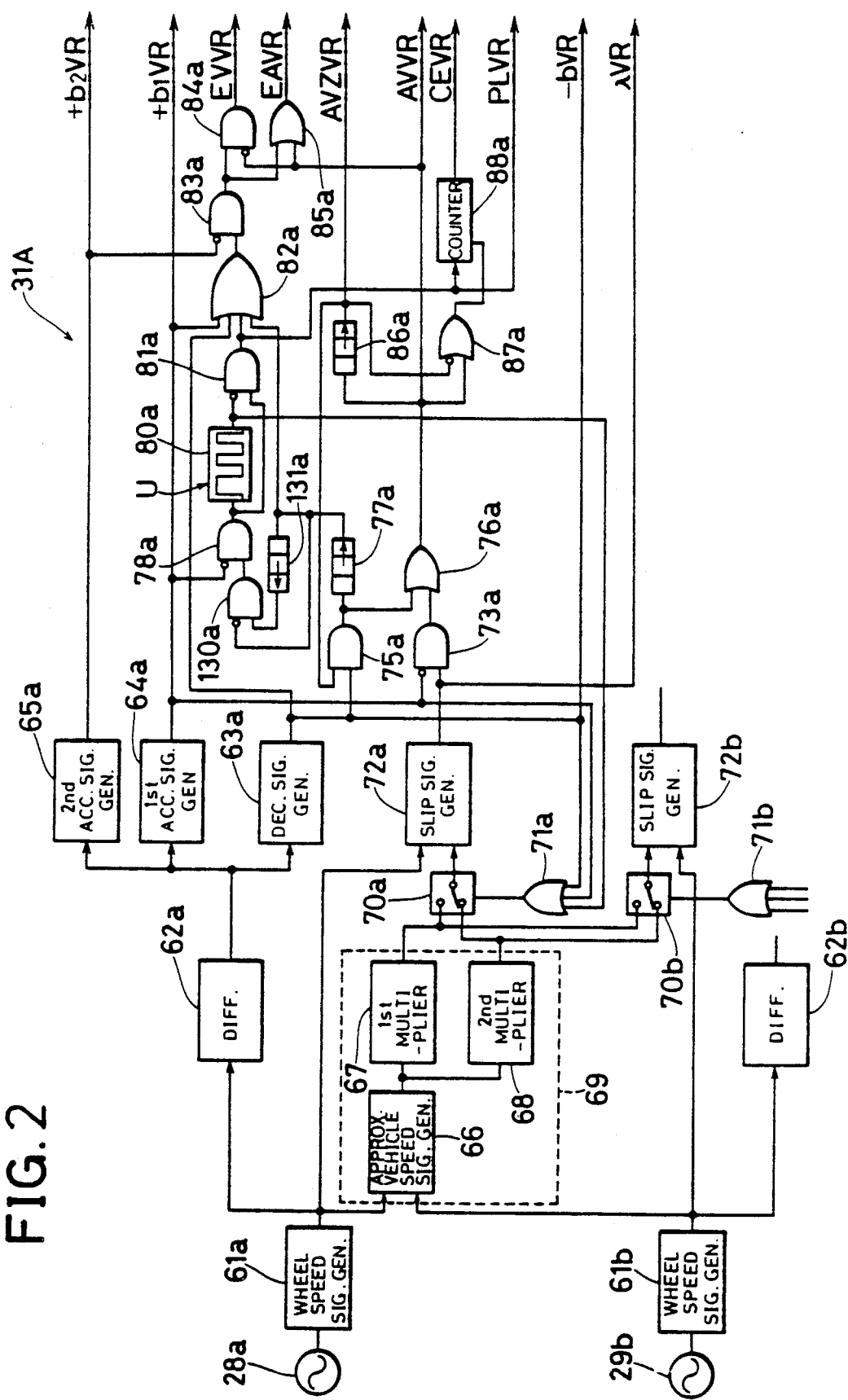
FIG. 2 is a block diagram of a judge part 31A of the control unit 31 in FIG. 1.

In FIG. 2, the slip signal is supplied to the OFF delay timer 86a. The output of the OFF delay timer 86a is supplied to the one input terminal of the AND gate 75a. Accordingly, hereinafter when the deceleration signal −b is generated, the output of the AND gate 75a, and therefore that of the OR gate 76a, becomes "1". Thus the signal AVHR is generated. Also, after the signal −b disappears, the output of the OFF delay timer 77a connected to the output terminal of the AND gate 75a is maintained at the level "1" for the delay time of the OFF delay timer 77a.

The output of the OR gate 76a is supplied to the OFF delay timer 86a. Accordingly, the signal AVZHR is generated as shown in FIG. 6(G). In FIG. 5, the motor drive signal Qo is generated from the amplifier 146. The motor 22 starts to be driven in FIG. 1.

Figure 3:
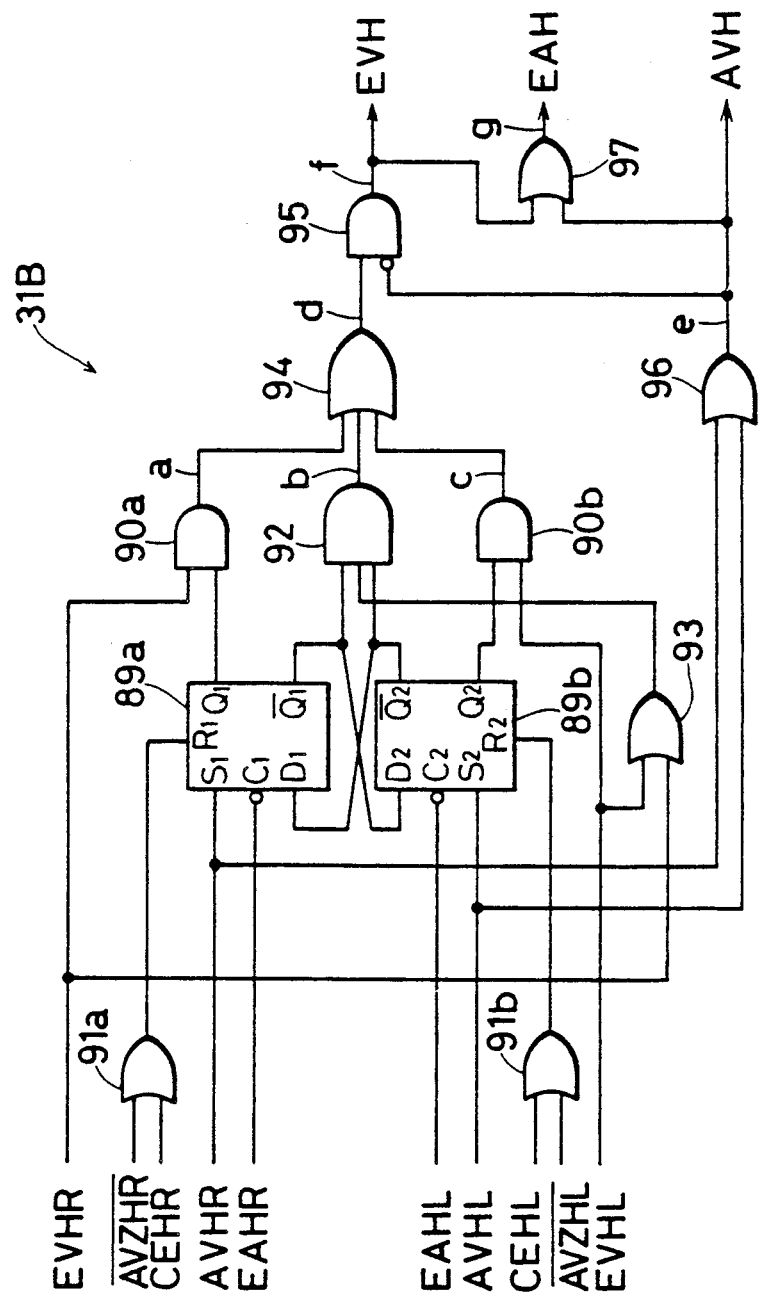
FIG. 3 is a circuit diagram of a selection part 31B of the control use 31 in FIG. 1.

In FIG. 3, the signal AVHR is supplied to the set terminal $S_1$ of the flip-flop 89a. The $Q_1$ output thereof becomes "1". The $\overline{Q}_1$ output thereof becomes "0". Accordingly, the input to the data terminal D2 of the other flip-flop 89b, as shown in FIG. 6(J). Therefore, the signal AVH is generated as the output of the OR gate 96, as seen in FIG. 6(S). As shown in FIG. 6(T), the signal EVH becomes "0". However, the signal EAH continues to be "1", as shown in FIG. 6(U).

In FIG. 5, the signal AVHR is supplied to the set terminals of the flip-flop 102b. The Q output thereof becomes "1", and is supplied to the one input terminals of the AND gates 104b, and 112b. The input signal EVH is supplied to the other input terminal of the AND gate 104b and is "0", while the input signal AVH is supplied to the other input terminal of the AND gate 112b is "1". Accordingly, the output of the AND gate 104b remains "0", while that of the AND gate 112b becomes "1". The output signal AV is obtained. Thus, the control signal Sa of the current level "1" is supplied to the solenoid portion 30a of the change-over valve 4a in FIG. 1. Thus, the brakes of the right front wheel 6a and left rear wheel 11b are relieved. The Q output of the one flip-flop 102b is "1", while the Q output of the other flip-flop 102a is "0". Now the right side of the road is judged to be "low side" by that fact.

At time t4, the other rear wheel 11b reaches the predetermined slip during the continuation of the signal AVHR as shown in FIG. 6(C). Thus, the signal AVHL is generated as shown in FIG. 6(F). In FIG. 3, it is supplied to the set terminal S2 of the flip-flop 89b. Accordingly, the Q2 output thereof becomes "1" and the $\overline{Q}$2 output thereof becomes "0". Thus, the input to the data terminal D1 of the flip-flop 89a becomes "0" as shown in FIG. 6(I).

As illustrated in FIG. 3, the signal AVHL is supplied to the one input terminal of the OR gate 96, too. Since the signal AVHR continues to be supplied to the other input terminal of the OR gate 96, the signal AVH remains "1". In FIG. 5, the signal AVHL is supplied to the set terminal S of the flip-flop 102a. However, since the Q output of the flip-flop 102b is supplied through the OR gate 106a to the reset terminal R of the flip-flop 102a, the Q output of the flip-flop 102a remains "0" due to the reset priority. Thus, the output of the AND gate 112a remains "0". The output signal AV for the left side is not generated. The brake of the left front wheel 6b is not relieved. However, when the left front wheel 6b generates the signal AVHL, it is independently controlled for brake relief, since the signal AVVL is supplied to the OR gate 111a. Thus, this will reduce the braking distance of the vehicle equipped with the arrangement of this embodiment of the invention.

The signal AVZHL becomes "1" with the signal AVHL, as shown in FIGS. 6(H) and (F) respectively. However, since the AVZHR has become "1", the output of the OR gate 145 has become "1". The output Qo is not influenced, and remains "1". The motor 22 continues to be driven. At time t5, the signal AVHL becomes "0". However, it has no influence on the other signals.

At time t6, the slip signal λ of the right rear wheel 11a disappears. Accordingly, the signal AVHR becomes "0" as shown in FIG. 6(C). In FIG. 2, the input to the one input terminal of the OR gate 85a becomes "0". However, after the signal −b disappears, the output of the OR gate 82a is still "1" because of the delay time of the OFF delay timer 77a. Accordingly, the output of the AND gate 84a, therefore the signal EVHR becomes again "1" with the disappearance of the signal AVHR. Furthermore, the output to the OR gate 85a, therefore the signal EAHR continues to be "1" as shown in FIG. 6(A).

In FIG. 3, the signal AVHR becomes "0". However, since the output of the OR gate 91a is still "0", the flip-flop 89a is not reset, but the Q output thereof remains "1" as shown in FIG. 8(L). The signal EVHR is still "1". Accordingly, the output "a" of the AND gate 90a remains "1", as shown FIG. 6(O). The output "e" of the OR gate 96 becomes "0". Accordingly, the output "f" of the AND gate 95, and therefore the signal EVH becomes again "1" from "0" as shown in FIG. 6(T). The output signal EAH of the OR gate 97 remains "1".

In FIG. 5, the input to the set terminals of the flip-flop 102b becomes "0". However, since the input to the reset terminal R thereof is "0", the Q output thereof remains "1". Since the signal EVH becomes again "1", the output of the AND gate 104b. therefore that of the OR gate 109b becomes "1". On the other hand, the input AVH to the one input terminal of the AND gate 112b becomes "0". Accordingly, the output thereof becomes "0", and the output signal AV disappears. With the disappearance of the output signal AV, the other output signal EV becomes "1". In FIG. 1, the change-over valve 4a is changed over to the position B, and the braking forces to the right front wheel 6a and the left rear wheel 11b are maintained at constant.

In FIG. 2 when the deceleration signal −b disappears, and the delay time of the OFF delay timer 77a lapses, the input to the fourth input terminal of the OR gate 82a becomes "0". However, it is assumed that the left rear wheel 11b reaches the predetermined first acceleration before the lapse of the delay time of the OFF delay timer 77a. Accordingly, the input to the first input terminal of the OR gate 82a becomes "1", and the signal EAHL continues to be "1" as shown in FIG. 6(D), as long as the first acceleration signal +b1 is generated, although the output of the OFF delay timer 77a becomes "0". At time t7 when the first acceleration signal +b1 disappears, the signal EAHR becomes "0".

In FIG. 3, the input to the clock terminal C2 becomes "0". It is inverted or negated and supplied to the clock terminal C2. The input "0" is supplied to the data terminal D2, and it is read out with the negated input to the clock terminal C2. Thus, the Q2 output becomes "0" as shown in FIG. 6(N). Accordingly, the Q2 output becomes "1". The Q1 output of the other flip-flop 89a remains "0". Accordingly, the output "b" of the AND gate 92 remains "0". The output "c" of the AND gate 90b becomes "0" with the disappearance of the Q2 output of the flip-flop 89b, as shown in FIG. 6(Q).

On the other hand, the Q1 output of the flip-flop 89a remains "1", and the right rear wheel 11b still generates the signal EVHR. Accordingly, the output "a" of the AND gate 90a continues to be "1", and the signal EVH remains "1" as shown in FIG. 6(T).

In FIG. 2, as soon as the first acceleration signal +b, disappears, the pulse generator 80a is driven for the delay time of the OFF delay timer 131a. The signal EAHL are cycled between "0" and "1", as shown in FIG. 6(D), from time t8. In FIG. 3, the one input to the OR gate 93 and the one input to the AND gate 90b are cycled between "0" and "1". However, the Q2 output of the one flip-flop 89b is "0", and the Q1 output of the other flip-flop 89a is "0". Accordingly, the output EAH of the OR gate 97, and the output EVH of the AND gate 95 are not cycled between "0" and "1", but they continue to be "1" with the signal EVHR. As a result thereof, the braking forces to the right front wheel 6a and left rear wheels 11b are still maintained at constant.

When the right rear wheel 11b generates the first acceleration signal +b, after time t7, the signal EVHR and EAHR continue to be "1" although the delay time of the OFF delay timer 77a. The braking forces to the right front wheel 6a and left rear wheel 11b are still maintained at constant. However, at time t8 when the first acceleration signal +b, disappears, the pulse generator 80a is driven, and the signal EAHR are cycled between "0" and "1" as shown in FIG. 6(A). Thus, in FIG. 3, the signals EVH and EAH are cycled between "0" and "1".

Accordingly, in FIG. 5, the output of the AND gate 104b are cycled between "0" and "1". As a result thereof, the braking forces to the right front wheel 6a and left rear wheel 11b are stepwisely increased.

When the counted pulses reach the predetermined value, the output CEHR of the counter 88a (in FIG. 2) in the judge circuit for the right rear wheel 11a becomes "1". Accordingly, in FIG. 5, the input of the third input terminal of the OR gate 106b becomes "1". The output of the OR gate 106b is supplied to the reset terminal R of the flip-flops 102b to reset the latter. The Q output thereof becomes "0". Although the pulses continue, the stepwise increase of the braking forces is stopped. When the Q output of the flip-flop 102b becomes "0", the other flip-flop 102a is released from the reset condition.

Hereafter, if the right side of the road is still "low side", the above operations are similarly repeated. When the "low side" is inverted on the road, or when the left side of the road becomes "low side", operations similar to the above described operations for the right front wheel 6a and rear wheels 11a and 11b are effected for the left front wheel 6b and right rear wheel 11a.

In the above description, the right side of the road is assumed to be low side. The brake holding signal EVHR is first generated from the right rear wheel 11a.

Thus, it is judged that the right side of the road is low side. Next, there has been described the case that the brake relieving signal AVHR is generated from this wheel 11a. Substantially the same operations as above are effected in the case that the brake holding signal EVVR and then the brake relieving signal AVVR are generated from the right front wheel 6a.

Also in that case, the Q output of the flip-flop 100', or the signal SLAV, is "0" in the low-side discrimination part 31C. Accordingly, it is judged that the right side of the road is low side. In FIG. 5, the input to the one input terminal of the AND gate 127b is "1", and the other input to the negation input terminal thereof is "0", since the signal AVZ is not generated. Accordingly, the output of the AND gate 127b becomes "1". And the output of the AND gate 123b becomes "1". The output EV of the AND gate 110b becomes "1" through the OR gates 122b, 107b, AND gate 108b and OR gate 109b.

Thus, the changeover valve 4a in FIG. 1 is changed over to the position B and the braking force to the right front wheel 6a and left rear wheel 11b are maintained at constant. Next, when the brake relieving signal AVVR is generated from the right front wheel 6a, it is supplied to the set terminal of the flip-flop 126b in FIG. 5, and the Q output thereof becomes "1", which is supplied to the one input terminal of the OR gate 121b. The output of the OR gate 121b is supplied to the one input terminals of the AND gates 104b and 112b. Further, the select-low signals EVH, AVH of the rear wheels are supplied to the other input terminals of the AND gates. Accordingly, the select-low control becomes possible between the rear wheels and the front wheel 6a. On the other hand, the signal AVVR is supplied to the one input terminal of the OR gate 111b. Accordingly, the output AV thereof becomes "1" and so that changeover valve 4a is changed over to the position C. Accordingly, the brake to the right front wheel 6a and left rear wheel 11b are relieved. Further, the Q output of the flip-flop 126b is supplied to the reset terminal of the other flip-flop 126a through the OR gates 121b and 125a.

Accordingly, even when the brake relieving signal AVVL is thereafter generated from the left front wheel 6b, the Q output of flip-flop 126a does not become "1". Thus, the judgment that the right side of the road is low side, is held. This fact is the same as above described with respect to the flip-flops 102a and 102b.

In the above-described manner, it is judged which side is lower in frictional coefficient between the right and left sides of road, from the judging results of the skid conditions of the wheels on the basis of the output of the wheel speed sensors associated with the front and rear wheels, respectively. The low side is thus decided.

Further, the low-side is able to be changed over at any time in accordance with the judge results of the skid conditions of the wheels. In other words, before a brake relieving signal is initially generated from any one of the front and rear wheels, the side of front and rear wheels from which the brake holding signal is first generated, is made the low side, and the side of the front and rear wheels from which the brake relieving signal is first generated, is made low side.

Further the "low side" is so designed as to be changed over in the case that the rear wheel 11b or front wheel 6b running on the "high side" generates the brake relieving signal or pressure decreasing signal AVHL or AVVL while both of the braking forces to the front and rear wheels 6a and 11a are stepwisely increased. In FIG. 5, while the signals PLVR and PLHR (outputs of the pulse generators 80a) are cycled between "1" and "0", the signal AVHL or AVVL becomes "1". The output of the AND gate 113b or 124b, therefore, that of the OR gate 106b or 125b becomes "1", and it is supplied to the reset terminal R of the flip-flop or 102b or 126b. The Q output thereof becomes "0". Accordingly, the output of the OR gate 106a or 125a becomes "0", and the input to the reset terminal R of the flip-flop 102a or 126a becomes "0". On the other hand, the signal AVHL or AVVL is supplied to the set terminal of the flip-flop 102a or 126a. The Q output thereof becomes "1". Thus, the "low side" is changed over.

According to a first modification of this embodiment, the "low side" is changed over in the case that the rear wheel 11b or front wheel 6b on the "high side" generates continuously the pressure decreasing signal AVHL or AVVL for a predetermined time, while the rear wheel 11a or front wheel 6a on the "low side" is rotating in the stable region or condition of the "$\mu$-slip characteristics". In order to obtain such an operation, a circuit as shown in FIG. 7 is added to the circuit of FIG. 5.

In FIG. 5, the signals AVHL and AVHR, AVVL and AVVR are supplied to the set terminals S of the flip-flops 102a, 102b, 126a and 126b, respectively. Referring to FIG. 7, they are further supplied through ON delay timers 221a, 221b, 221a' and 221b', to one input terminals of AND gates 223a, 223b, 223a' and 223b', respectively. The signals AVZHL, AVZHR and AVZVL, AVZVR are supplied to first input terminals of AND gates 222a, 222b, 222a' and 222b', the signals $-bHL$, $-bHR$, $-b1VL$ and $-bVR$ to second negation input terminals thereof, the signals $+b_1HL$, $+b_1HR$, $+bVL$, and $+b1VR$ to third negation input terminals thereof, and the signals $\lambda HL$, $\lambda HR$, $\lambda VL$ and $\lambda VR$ to fourth negation input terminals thereof. Output terminals of the AND gates 222a, 222b, 222a' and 222b' are connected to one input terminals of OR gates 224a, 224b, 224a' and 224b'. Negations of the signals AVZHL, AVZHR, AVZVL and AVZVR or the signals AVZHL, AVZHR, AVZVL and AVZVR are supplied to other input terminals of the OR gates 224a, 224b, 224a' and 224b'.

The definition of "the stable region of the $\mu$-slip characteristics" is described, for example, in "The Society of Automobile Technology", page 133, no. 31, 1985. The "stable region" means that the wheel is rotating at smaller slip rates than the slip rate at the maximum of $\mu$-value (frictional value) in the slip rate-frictional coefficient $\mu$ characteristics. According to this modification, the case of no occurrence of either the slip signal, the first acceleration signal $+b$, or the deceleration signal $-b$, is used as the certain "stable region".

In this embodiment, the front and rear wheels on the low side are made to be in the stable region of the $\mu$-slip characteristics, when they are stepwisely braked, as described with reference to FIG. 5.

When the rear or front wheel on the low side already generates the signal AVZHR or AVZVR or the antiskid control has been effected, and when the rear wheel 11a or front wheel 6a on the low side is rotating in the stable region, the output of the AND gate 222b or 222b' is "1". Accordingly, the input to the one input terminal of the AND gate 223b or 223b' of the output stage is "1". When the rear wheel 11b or front wheel 6b on the high side generates continuously the signal AVHL or AVVL for a longer time than the delay time of the ON delay timer 221a or 221a', the input to the other input terminal of the AND gate 223b or 223b' becomes "1", and so the output thereof becomes "1". Accordingly the flip-flop 102b or 126b in FIG. 5 is reset, while the other flip-flop 102a or 126a is released from the reset condition and set with the signal AVHL or AVVL. The Q output of the flip-flop 102a or 126a becomes "1". Thus, the "low side" is changed over.

According to a second modification of this embodiment, the "low side" is changed over in the case that the rear wheel 11a or front wheel 6a on the low side is rapidly accelerated, and so generates the second acceleration signal $+b_2HR$ or $+b_2VR$, while the rear wheel 11b or front wheel 6b on the high side generates the pressure decreasing signal AVHL or AVVL. Or the "low side" is changed over in the case that the rear wheel 11b or front wheel 6b on the high side generates continuously the pressure decreasing signal AVHL or AVVL for a longer time than a predetermined time, while the pressure decreasing signal AVHR or AVVR of the rear wheel 11a or front wheel 6a on the low side disappears.

Figure 8:
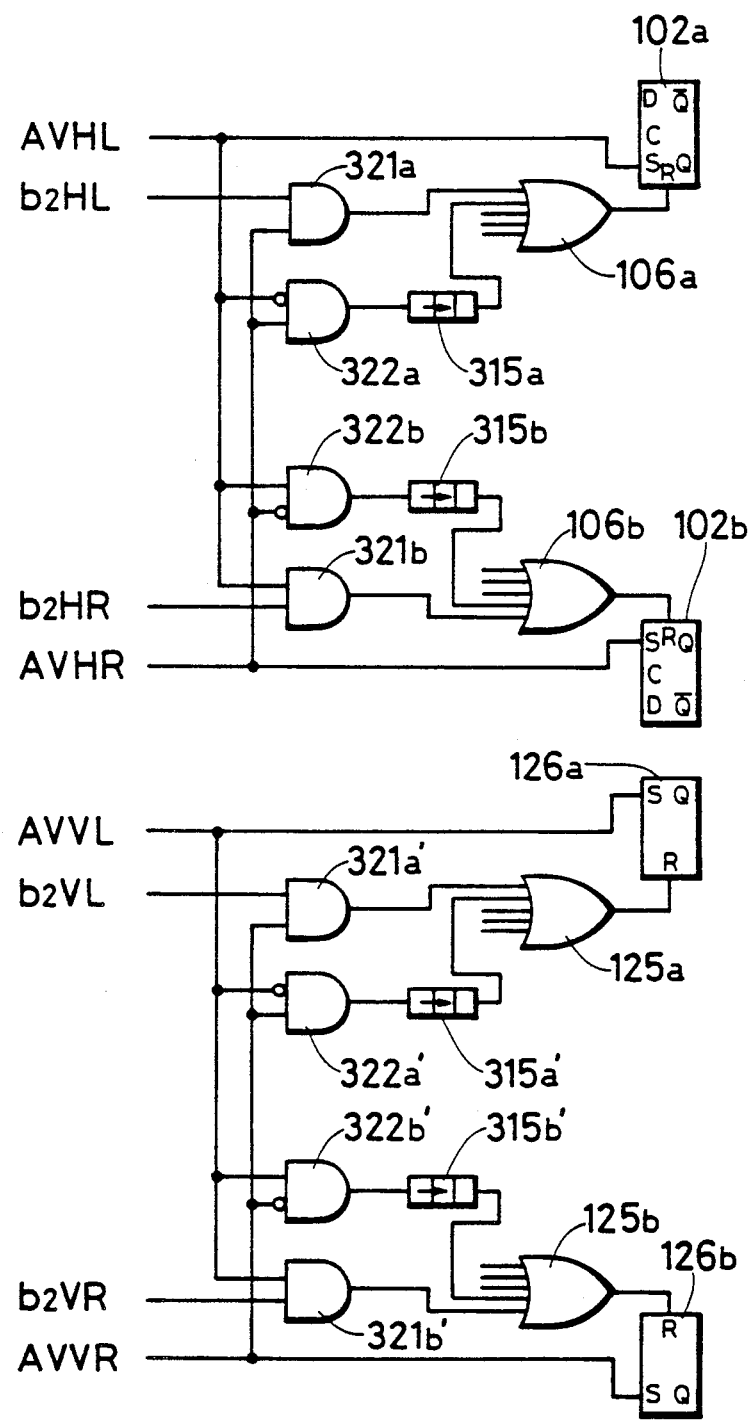
FIG. 8 is a circuit diagram of an important part of a second modification of the logic circuit of FIG. 5.

FIG. 8 shows the second modification. Other component parts are the same as the circuit of FIG. 5. In FIG. 8, the signals AVHL, AVHR, AVVL and AVVR are supplied to one negation input terminals of AND gates 322a, 322b, 322a' and 322b', respectively. Further, they are supplied to other input terminals of the other AND gates 322b, 322a, 322b' or 322a' and one input terminals of AND gates 321b, 321a, 321b' and 321a'.

The signals $+b_2HL$, $+b_2HR$, $+b_2VL$ and $+b_2VR$ are supplied to other input terminals of the AND gates 321a, 321b, 321a' and 321b', respectively. Output terminals of the AND gates 321a, 321b, 321a' and 321b' are connected to fifth input terminals of the OR gates 106a, 106b, 125a and 125b. Output terminals of the AND gates 322a, 322b, 322a' and 322b' are connected through ON delay timers 315a, 315b, 315a' and 315b' to fourth input terminals of the OR gates 106a, 106b, 125a and 125b.

In FIG. 8, the rear wheel 11b or front wheel 6b on the high side generates the brake relieving signal AVHL or AVVL. During the generation of the signal AVHL or AVVL, the rear wheel 11a or front wheel 6a is rapidly accelerated, and generates the second acceleration signal $+b_2HR$ or $b_2HR$. The output of the AND gate 321b or 321b' becomes "1". Accordingly, that of the OR gate 106b or 125b becomes "1" to reset the flip-flop 102b or 126b. On the other hand, the other flip-flop 102a or 126a is set with the signal AVHL or AVVL. The Q output thereof becomes "1". Thus, the "low side" is changed over.

When the rear wheel 11b or front wheel 6b on the high side generates continuously the brake relieving signal AVHL or AVVL for a longer time than the delay time of the ON delay timer 315b or 315b' during the time that the brake relieving signal AVHR or AVVR of the rear wheel 11a or front wheel 6a on the low side disappears, the output of the ON delay timer 315b or 315b' becomes "1". Accordingly, the output of the OR gate 106b or 106b' becomes "1", and resets the flip-flop 102b or 126b'. On the other hand, the other flip-flop 102a or 126a' is released from the reset condition, and it is set with the signal AVHL or AVVL. Thus, the "low side" is changed over.

According to the second modification, as described with reference to FIG. 8, the low side is changed over in the case that the rear wheel 11b or front wheel 6b on the high side generates continuously the brake relieving signal AVHL or AVVL for a longer time than the predetermined time during the time that the brake relieving signal AVHR or AVVR of the rear wheel 11a or front wheel 6a on the low side disappears. The above described predetermined time is made the delay time set in the ON delay timers 315a, 315b, in the second modification.

However, the predetermined time may be changed in accordance with the generating time of the brake relieving signal of the rear wheel 11a or front wheel 6a on the low side in the last control cycle.

In the above embodiment, when the brake to the front wheel on the low side is relieved, also the brake to the rear wheel diagonally connected to the front wheel on the low side is relieved. Thus, the brake to the rear wheel on the high side is relieved. On the other hand, the brake to the rear wheel on the low side continues to rise.

Accordingly, there is the fear that the rear wheel on the low side locks. However, both of the front wheels and both of the rear wheels are not locked and so the running stability can be secured.

However, when a lock mechanism is provided in the differential gear 34, the rear wheel locking on the low side can be avoided.

For example, when the brake pressure to the right front wheel 6a decreases, the brake pressure to the left rear wheel 11b belonging to the same conduit as the right front wheel 6a decreases. Accordingly, the wheel speed of the left rear wheel 11b increases.

On the other hand, the brake pressure of the right rear wheel 11a rises with the left front wheel 6b of the same conduit system. The right rear wheel 11a tends to lock. However, when the rotational torque difference becomes larger than a predetermined value between the rear wheels 11a and 11b, some rotational torque is transmitted through the lock mechanism from the left rear wheel 11b having larger rotational torque to the right rear wheel 11a. Accordingly, the wheel speed of the right rear wheel 11a rises.

Thus, locking of the right rear wheel 11a on the low side can be prevented. The brake holding and relieving operations of the other conduit system can be effected in the same manner.

When the lock mechanism such as a limited slip differential (LSD), a viscous coupling or multi-plate transfer is provided in the differential gear 34, it is difficult to detect the rotational speed difference between the rear wheels. However, since the low side can be judged also from the speed difference between the front wheels, the correct judgement of the low side is secure.

Next, an anti-skid control apparatus according to a second embodiment of this invention will be described with reference to FIG. 9 and FIG. 10. Parts in FIG. 9 which correspond to those in FIG. 1 are denoted by the same reference numerals, the description of which will be omitted.

In this embodiment, a valve apparatus 120 is arranged between the wheel cylinders 7a and 7b of the front wheels 6a and 6b and those 12a and 12b of the rear wheels 11a and 11b.

Figure 9:
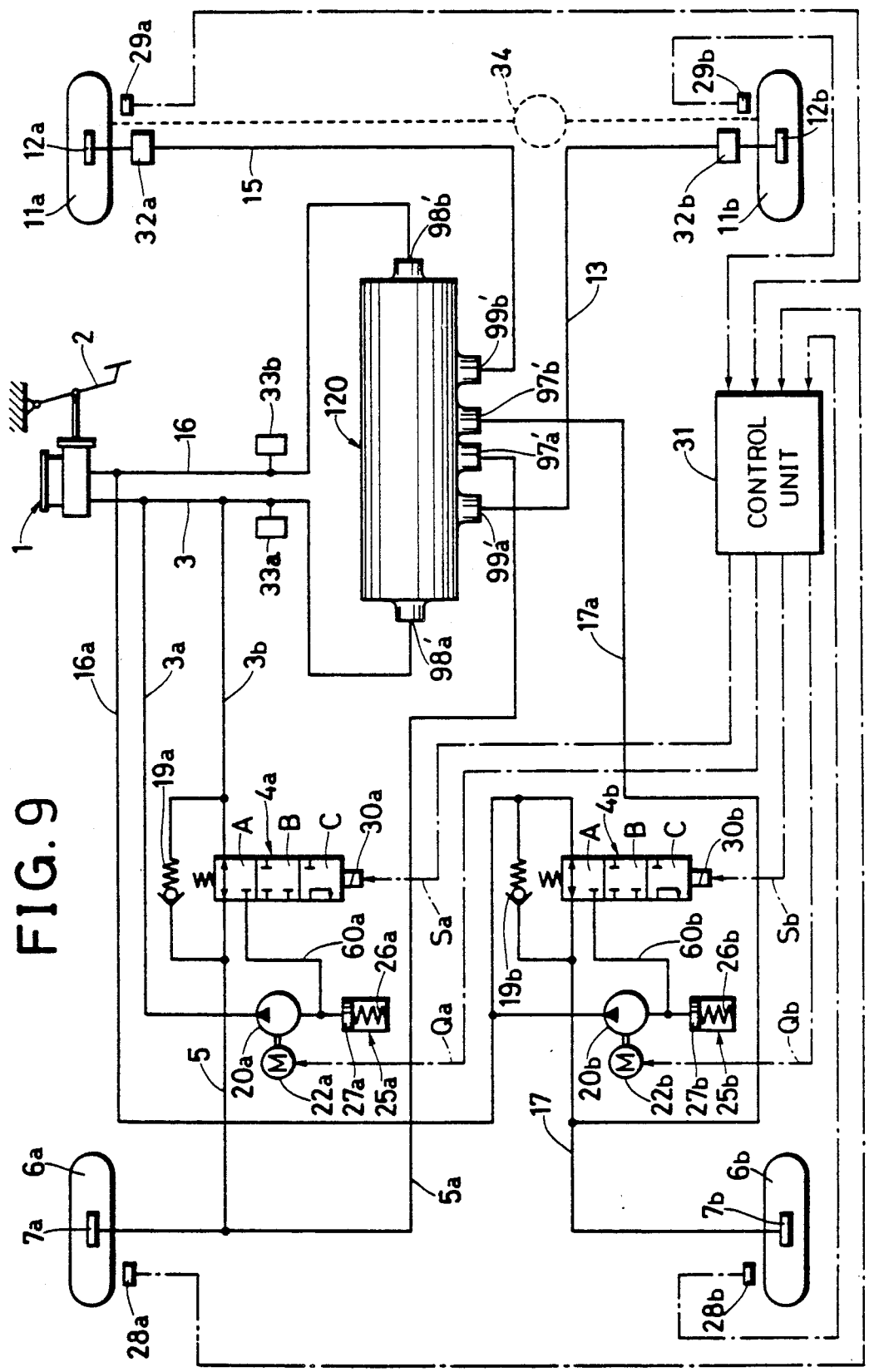
FIG. 9 is a schematic view of anti-skid control apparatus according to a second embodiment of this invention.

Further, the pump 20a and 20b and motors 22a and 22b are separately shown in FIG. 9, respectively. However, they are equal to those shown in FIG. 1 in which they are single.

Next, the details of the valve apparatus 120 will be described with reference to FIG. 10.

Figure 10:
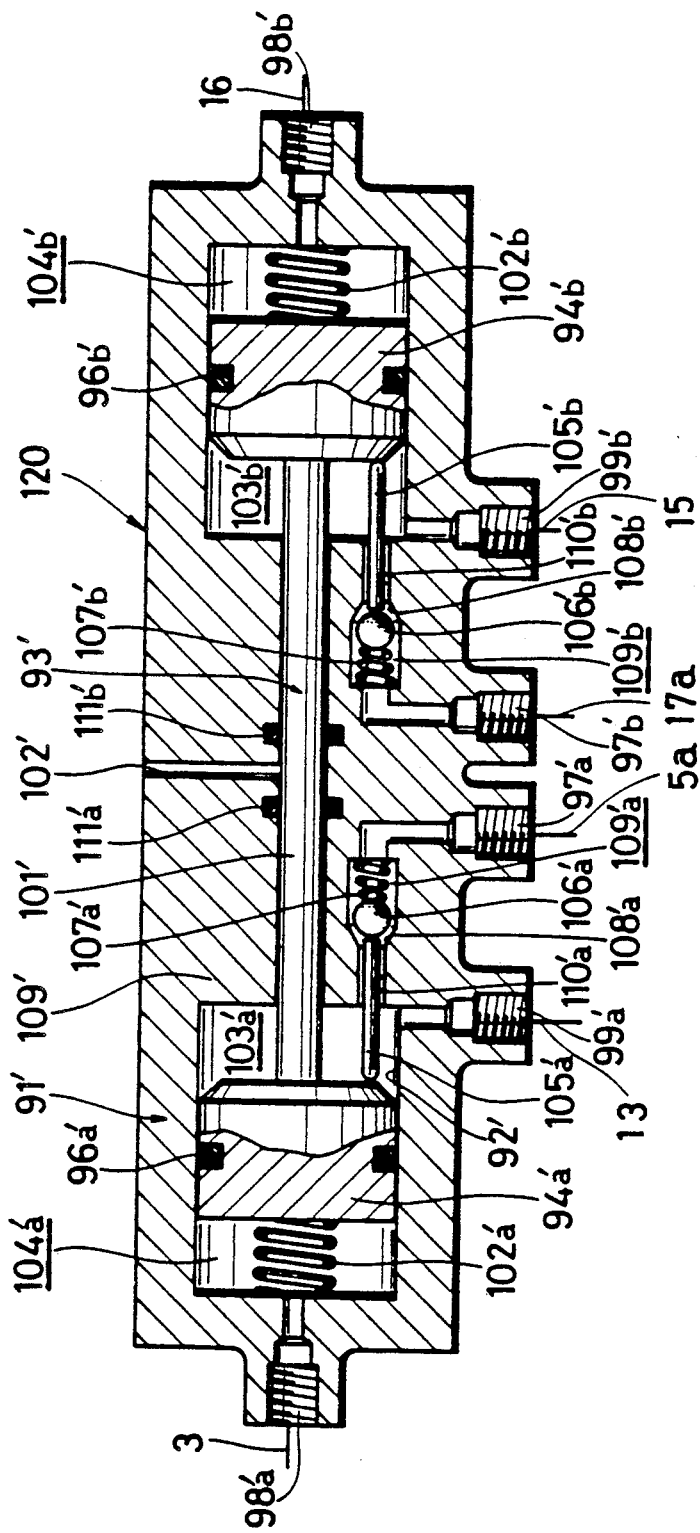
FIG. 10 is an enlarged cross-sectional view of the valve apparatus in FIG. 9.

In FIG. 10, an axial through hole 92' is made in a casing 91' for a valve apparatus 120. A piston group 93' consisting of three members is slidably fitted to the stepped hole 92'. The three members are a pair of larger-diameter pistons 94a' and 94b' and a smaller-diameter piston 101'. The larger-diameter pistons 94a' and 94b' are provided with seal rings 96a' and 96b'. Output chambers 103a' and 103b' are formed at the insides of the larger-diameter pistons 94a' and 94b'. Master cylinder pressure chambers 104a' and 104b' are formed about the outsides of the larger-diameter pistons 94a' and 94b'. The smaller-diameter piston 101' is slidably fitted to a central hole of a partition 109' of the casing 91', sealed with seal rings 111a' and 111b'. A space between the seal rings 111a' and 111b' communicates through a vent 102' with the atmosphere. The larger-diameter pistons 94a' and 94b' are urged inwards by springs 102a' and 102b' which are equal to each other in spring force. Thus, the piston group 93' is normally located at a shown neutral position.

The master cylinder pressure chambers 104a' and 104b', and the output chambers 103a' and 103b' communicate with the conduits 3 and 16, and 13 and 15 through connecting ports 98a' and 98b' and output ports 99a', respectively.

Valve rods 105a' and 105b' are slidably fitted to axial holes 110a' and 110b' made in the partition 109' of the casing 91'. Outer ends of the valve rods 105a' and 105b' contact with the inner surfaces of the larger-diameter pistons 94a' and 94b'. Inner ends thereof contact with valve balls 106a' and 106a' urged by springs 107a' and 107b'. When the piston group 93' is located at the shown neutral position, the valve balls 106a' and 106b' are separated from valve seats 108a' and 108b', as shown in FIG. 10. Valve chambers 109a' and 109b' in which the springs 107a' and 107b' are compressed, communicate with the conduits 5a and 17a through input ports 97a' and 97b', respectively.

Next, there will be described operations of the above-described apparatus of the second embodiment.

First, it is assumed that both of the two conduit systems are in order, and the right front and right rear wheels 6a and 11a are running on the frictionally lower side of the road, as in the first embodiment.

When the valve 4a is changed over into the position C with the start of the skid control operation, the pressurized fluid is discharged from the wheel cylinder 7a of the right front wheel 6a into the reservoir 25a through the conduit 60a, while it is discharged from the wheel cylinder 12b of the left rear wheel 11b into the reservoir 25a through the conduit 13, the output port 99a' of the valve apparatus 120, the space between the valve ball 106a' and the valve seat 108a' therein, the input port 97a' thereof, and the conduits 5a and 60a. Thus, the brakes of the wheel 6a and 11b are relieved.

In the valve apparatus 120, the fluid pressure decreases in the one output chamber 103a' while it still increases in the other output chamber 103b'. Accordingly, the whole of the piston group 93' is moved rightwards. The right valve rod 105b' is moved rightwards together, and the valve ball 106b' comes to contact with the valve seat 108b'.

Thus, the valve ball 106b' closes. On the other hand, the left valve rod 105a' is moved rightwards, and the valve ball 106a' is further separated from the valve seat 108a'. Thus, the valve ball 106a' is maintained at the open state.

The volume of the one output chamber 103b' increases with the rightward movement of the piston group 93'. Now the one output chamber 103b' is interrupted from the wheel cylinder 7b of the left front wheel 6b. Accordingly, the fluid pressure of the wheel cylinder 12a of the right rear wheel 11a communicating always with the one output chamber 103b' decreases with the increase of the volume of the chamber 103b'. The other operations in the case that both of the two conduit systems are in order, are the same as in the first embodiment.

The control unit 31 is equal to that of the first embodiment. The output signals Sa and Sb change in the same manner as those of the first embodiment. The piston groups 93' are moved rightwards or leftwards in accordance with the levels of the signals Sa and Sb. The brake pressure of the rear wheels 11a and 11b change in accordance with the lower one of the brake pressures of the front wheels 6a and 6b. When the valve apparatus 120 is used, the locking of both of the rear wheels can be avoided.

Next, there will be described the case that one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly, in the valve apparatus 120, the fluid pressure of the one master cylinder pressure chamber 104b' rises, while that of the other master cylinder pressure chamber 104a' remains zero.

Thus, the fluid pressures to both sides of the one larger-diameter piston (94a') of the piston group 93' are zero. Those to both sides of the other larger-diameter piston 94b' of the piston group 93' are not zero, and substantially equal to each other. As the result, the piston group 93' is not moved, and remains located at the shown neutral position. Accordingly, the valve ball 106b' remains separated from the valve seat 108b'.

Thus, in the right conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 1 into the wheel cylinder 12a of the right rear wheel 11a through the conduit 17a, the input chamber 109b' of the valve apparatus 120, the output chamber 103b' thereof (the valve ball 106b' opened), and the conduit 15. Thus, the braking force can be securely obtained in the one conduit system.

When the valve 4b is changed over into the position B or C with the tendency of the locking of the front or rear wheel 6b or 11a, the fluid pressure of the input and output chambers 109b' and 103b' becomes lower than that of the master cylinder pressure chamber 104b' in the valve apparatus 120, and so the piston group 93' is moved rightwards with the fluid pressure difference between both sides of the larger diameter piston 94b. Accordingly, the valve ball 106b' is moved further rightwards and separated far from the valve seat 108b'. The valve ball 106b' remains separated.

When the valve 4b is changed over into the position B, the wheel cylinders 7a and 12a of the wheels 6b and 11a are interrupted both for the master cylinder and from the reservoir 25b, so that the fluid pressure of the wheel cylinders 7b and 12a increases with the rightward movement of the piston group 93', since the volume of the output chambers 103b' decreases therewith.

Whether the valve 4b is changed over or not to position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented from locking.

Next, a third embodiment of this invention will be described with reference to FIG. 11 to FIG. 13.

The conduit system is the same as that of the first embodiment which is shown in FIG. 1. FIG. 11 shows a selection part 31B' of a control unit, and it includes a low-side discrimination part. Parts in FIG. 11 which correspond to those in FIG. 3, are denoted by the same reference numerals, the description of which will be omitted.

Figure 11:
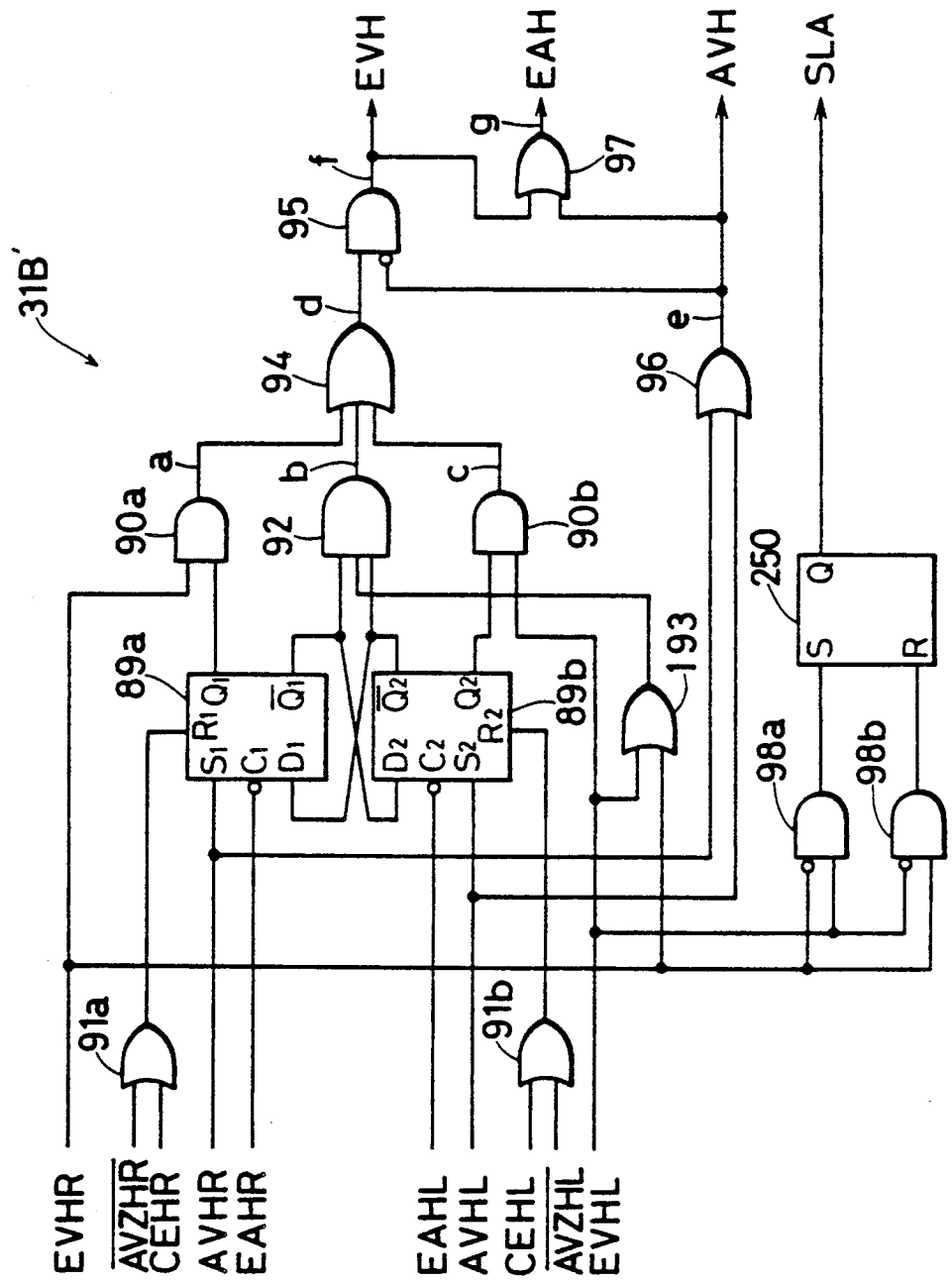
FIG. 11 is a circuit diagram of a selection part 31B' in a control unit, in an anti-skid control apparatus according to a third embodiment of this invention.

In FIG. 11, the low-side discrimination part consists of AND gates 98a and 98b and a flip-flop 250.

The output signals EVHR and EVHL are further supplied to one negation input terminals of AND gates 98a and 98b, and to other input terminals of the other AND gates 98b and 98a. Output terminals of the AND gates 98a and 98b are connected to a set terminals of a flip-flop 250, and a reset terminal R thereof. A signal SLA is obtained from an output terminal Q of the flip-flop 250, and it is supplied to the subsequent logic part 31C'.

Next, the logic part 31C' of the control unit 31 will be described in detail with reference to FIG. 12.

The logic part 31C' is constructed in nearly symmetrical manner with respect to the right and left wheels.

The input signals CEVL, CEVR, AVZVL, AVZVR, EVVL, EVVR, AVVL, AVVR, EAVL, EAVR, CEHL, CEHR, AVHL, AVHR, PLHL, PLHR, PLVL, PLVR are supplied from the judge part 31A. And the input signals EVH, AVH, EAH and SLA are supplied from the selection part 31B'.

The signals CEVL and CEVR are supplied to one input terminals of OR gates 205a and 205b. The signals AVZVL and AVZVR are supplied to another negation input terminals of the OR gates 205a and 205b. Output terminals of the OR gates 205a and 205b are connected to reset terminals of flip-flops 201a and 201b. The signals EVVL and EVVR are supplied to one input terminals of AND gates 203a and 203b and OR gates 207a and 207b.

The signals AVVL and AVVR are supplied to set terminals S of the flip-flops 201a and 201b, and one input terminals of OR gates 211a and 211b. The signals EAVL and EAVR are negated and then supplied to clock terminals C of the flip-flops 201a and 201b. Output terminals Q of the flip-flops 201a and 201b are connected to other input terminals of the AND gates 203a and 203b. Q terminals of the flip-flops 201a and 201b are connected to first input terminals of AND gates 208a and 208b, and further to data terminals D of other flip-flops 202a and 202b. Similarly, Q terminals of the flip-flops 202a and 202b are connected to data terminals D of the other flip-flops 201a and 201b, and they are connected to third input terminals of the AND gates 208a and 208b. Output terminals of the OR gates 207a and 207b are connected to second input terminals of the AND gates 208a and 208b.

The signals AVHL and AVHR are supplied to set terminals S of the flip-flops 202a and 202b. Q output terminals of the flip-flops 202a and 202b are connected to one input terminals of AND gates 204a, 204b, 212a and 212b. Further, they are connected to third input terminals of the OR gates 206b and 206a. Output terminals of the AND gates 204a and 204b are connected to third input terminals of OR gates 209a and 209b. Output terminals of the AND gates 203a, 203b, 208a and 208b are connected to first and second input terminals thereof, respectively.

Output terminals of the AND gates 212a and 212b are connected to other input terminals of the OR gate 211a and 211b. Output terminals of the OR gates 209a, 209b, 211a and 211b are connected to one input terminals of AND gates 210a and 210b, and to other negation input terminals thereof.

The signals AVHL and AVHR are further connected to third input terminals of AND gates 213b and 213a. The signals PLHL, PLVL and PLHR, PLVR are supplied to first and second input terminals of the AND gates 213a and 213b, respectively. Output terminals of the AND gates 213a and 213b are connected to second input terminals of the OR gates 206a and 206b. The signals CEHL and CEHR are supplied to first input terminals of the OR gates 206a and 206b.

The signal EVH is supplied to one input terminals of AND gates 214a and 214b, and further to the other input terminals of the OR gates 207a and 207b. Output terminals of the AND gates 214a and 214b are connected to the other input terminals of the OR gates 207a and 207b. The signal SLA, as it is, is supplied to another input terminal of the one AND gate 214a, while the signal SLA is negated, and then supplied to another input terminal of the other AND gate 214b. The signal AVH is supplied to other input terminals of the AND gates 212a and 212b. And the signal EAH is negated and then supplied to clock terminals C of the flip-flops 202a and 202b.

In the above-described manner, the first select-low control signals are logically combined with the judge results of the front wheel running on the frictionally low side of the road, to form second select-low control signals.

Output signals EV' and EV of the AND gates 210a and 210b at the last stage of the logic part 31C' correspond to the control signals Sb and Sa of the current level "½", and they are supplied to the solenoid portion 30b and 30a of the change-over valves 4b and 4a in FIG. 1, respectively. Output signals AV' and AV of the OR gates 211a and 211b at last stage of the logic part 31C' correspond to the control signals Sb and Sa of the current level "1", and they are supplied to the solenoid portions 30b and 30a of the change-over valves 4b and 4a in FIG. 1, respectively.

The logic part 31C' includes a motor drive circuit which consists of OFF delay timers 8a and 8b, an OR gate 145 and an amplifier 146 connected to an output terminal of the OR gate 145. The signals AV and AV' are supplied to input terminals of the OFF delay timers 8a and 8b. An output Qo of the amplifier 146 is supplied to the motor 22 in FIG. 1.

This embodiment is applied to a four wheel drive (4WD) vehicle. Next, the drive system will be described with reference to FIG. 13.

Although schematically shown, driving power of an engine 42 is transmitted to a front wheel axle 40 (front wheels 6a and 6b shown in FIG. 1, are associated at both ends) through a center differential 44, a center shaft 48 and a front differential 43. Further, the driving power of the engine 42 is transmitted to a rear wheel axle 41 (rear wheels 11a and 11b are associated at both ends) through the center differential 44, the center shaft 48 and a rear differential 46. Lock apparatus 45 and 47 are connected in parallel with the center differential 44 and the rear differential 46. For facilitating the understanding, the parallel connections are shown. However, the differentials may contain the lock apparatus, respectively.

The lock apparatus 45 and 47 are, for example, a viscous coupling or a Limited Slip Differential (LSD). As well known, when the rotational torque difference becomes larger than a predetermined value, between the right and left wheels, or between the wheels of the front and rear axles, some rotational torque is transmitted to the other of smaller rotational torque from the one of larger rotational torque. Or a torque in proportion to the rotational torque difference is transmitted to the other.

Next, there will be described operations of the above described anti-skid apparatus.

The operations of the case that the wheels 6a, 6b, 11a and 11b run on the road which is uniform in frictional coefficient, are substantially the same as the first embodiment.

Next, operations of the control unit according to this embodiment will be described.

It is now assumed that the frictional coefficient of the right side is smaller (low side). The brake pedal 2 is trodden. At time t1, the right rear wheel 11a reaches the predetermined deceleration, and so the signal −b is generated from the deceleration signal generator corresponding to the deceleration signal generator 63a of FIG. 2 in the judge circuit (equal to that of the first embodiment) for the right rear wheel 11a. Although FIG. 2 shows the judge circuit for the right front wheel 6a, the same reference symbols will be hereinafter used for the corresponding elements or circuit blocks for the convenience of the description.

The signal −b is supplied to the OR gate 71a, and the movable contact of the change-over circuit 70a is changed over to the output side of the multiplier 67, by the output of the OR gate 71a. The signal −b is further supplied to the third input terminal of the OR gate 82a. The output of the OR gate 82a generates the output signal EVHR through the AND gates 83a and 84a, and further the output signal EAHR through the OR gate 85a.

As shown in FIG. 6(A), the signal EAHR becomes "1" at time t1. In FIG. 11, the Q and Q outputs of the flip-flops 89a and 89b are "1", and the signal EVHR is now supplied to the AND gate 92. Accordingly, the output "b" of the AND gate 92 becomes "1", and so both of the outputs "d" and "f" of the OR gate 94 and AND gate 95 become "1". Thus, the signal EVH becomes "1". Thus, at time t1, the outputs "b", "d" and "f" becomes "1", as shown in FIG. 6(P), (R), (T). Accordingly, the output "g" of the OR gate 97 becomes "1". Thus, the signal EAH becomes "1", in FIG. 11.

Further, in FIG. 11, the signal EVHR is supplied to the AND gates 98a and 98b. Since the signal EVHL is still "0", the output of the AND gate 98b becomes "1", while that of the other AND gate 98a remains "0". Accordingly, the signal SLA remains "0". The right side of the road is judged to be "low side", by that fact.

Figure 12:
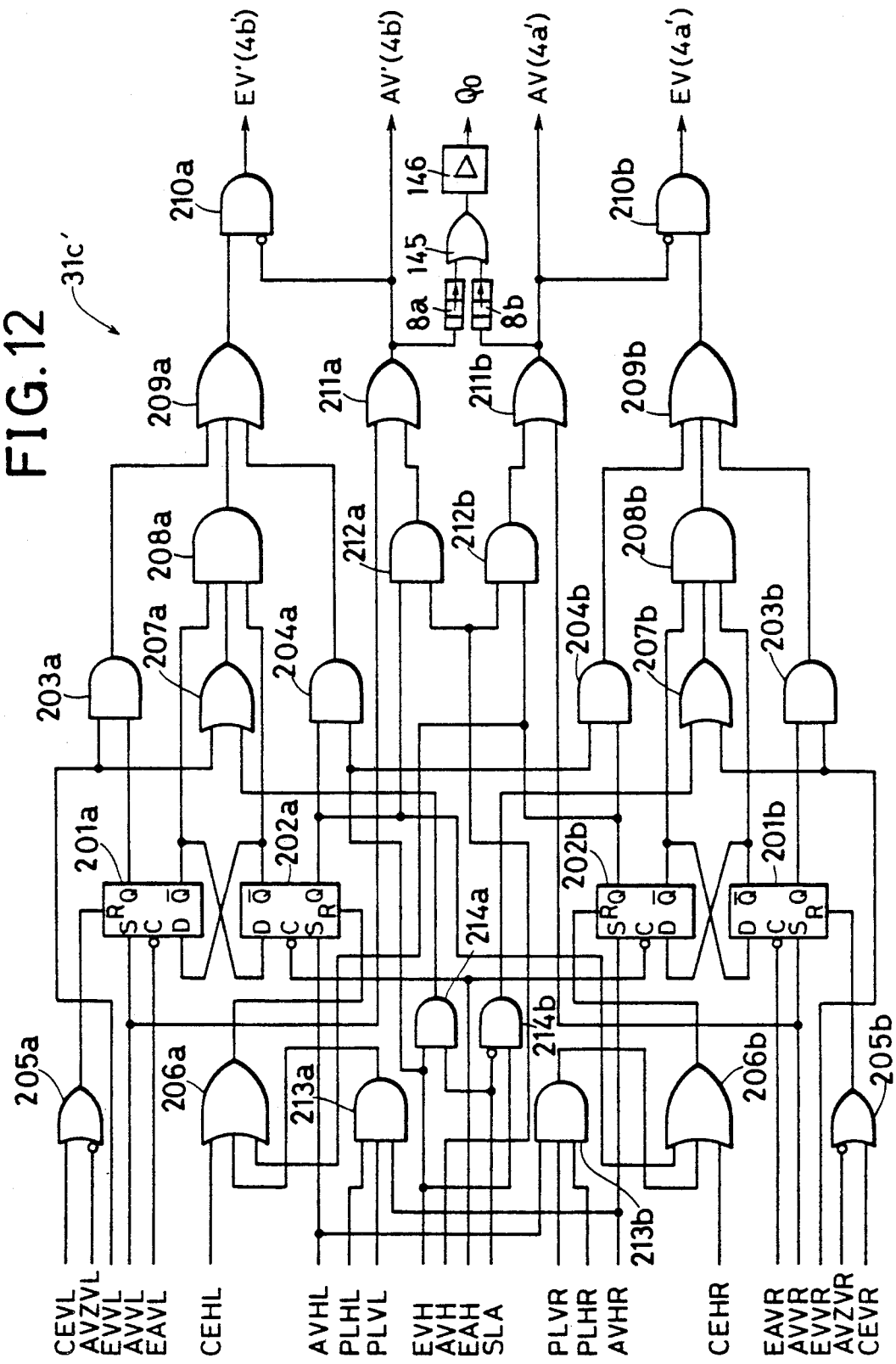
FIG. 12 is a circuit diagram of a logic part 31C' in the control unit, in the anti-skid control apparatus of the third embodiment.
Figure 13:
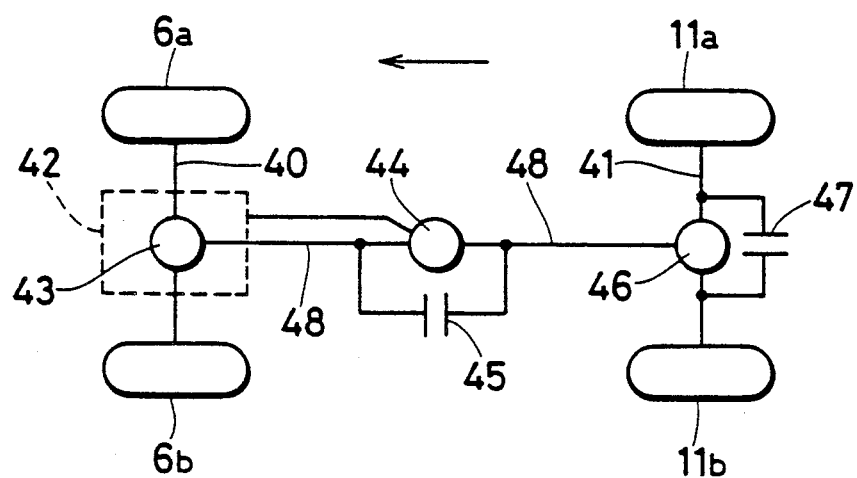
FIG. 13 is a schematic view of a drive system of the vehicle or automobile provided with the third embodiment.

In FIG. 12, the signal EVH is supplied to the one input terminal of the AND gate 204a. However, since the Q output of the flip-flop 202a to the other input terminal of the AND gate 204a is still "0", the output of the AND gate 204a is "0". The signal EVH is also supplied to the input terminal of the AND gate 204b. However, since the Q output of the flip-flop 202b is similarly "0", the output of the AND gate 204b is also "0".

The signal EAH is supplied to the negation clock terminals C of the flip-flops 202a and 202b. However, since it is negated, the Q outputs of the flip-flops 202a and 202b remain "0".

The signal SLA is supplied to the AND gates 214a and 214b, and is now "0". The negated signal SLA is supplied to the AND gate 214b. Accordingly, the output of the AND gate 214b becomes "1", and therefore, the output of the OR gate 207b becomes "1". The input to the second input terminal of the AND gate 208b becomes "1". Since the Q outputs of the flip-flops 201b and 202b are "1", the output of the AND gate 208b becomes "1". The output of the OR gate 209b, and therefore that of the AND gate 210b becomes "1". Thus, the output signal EV becomes "1". Accordingly, the control signal Sa of the current level $\frac{1}{2}$ is supplied to the solenoid portion 30a of the change-over valve 4a'. Thus, the braking forces to the right front wheel 6a and rear wheels 11a and 11b are maintained at constant. The lock apparatus 47 functions.

At time t2, the rear wheel 11b on the "high side" of the road reaches the predetermined deceleration. Therefore, signal EAHL is generated, as shown in FIG. 6(D). It is supplied to the other input terminal of the OR gate 93. The signal EVHR is already supplied to the other input terminal of the OR gate 93. Since it is maintained, the output of the OR gate 93, therefore, that "b" of the AND gate 92, that "d" of the OR gate 94, and the output signals EVH, EAH are unchanged as "1", as shown in FIG. 6 (D), (R), (T), (U). The output of the AND gate 98b becomes "0". However, the output of the other AND gate 98a remains "0". Accordingly, the Q output of the flip-flop 250 remains "0". Thus, the right side of the road is judged surely to be still "low side".

At time t3, the right rear wheel 11a generates the signal AVHR as shown in FIG. 6(C). It reaches the predetermined slip. The slip signal λ is generated from the slip signal generator 72a of the judge circuit for the right rear wheel 11a. It is supplied to the one input terminal of the AND gate 73a. Since the first acceleration signal $+b_1$ is not generated, the output of the AND gate 73a becomes "1". Thus, the signal AVHR is generated. At the same time, the output of the AND gate 84a or signal EVHR becomes "0". However, the output of the OR gate 85a or the signal EAHR continues to be "1", as shown in FIG. 6(A). In FIG. 11, the signal SLA remains "0".

In FIG. 2, the slip signal is supplied to the OFF delay timer 86a. The output of the OFF delay timer 86a is supplied to the one input terminal of the AND gate 75a. Accordingly, hereinafter when the deceleration signal −b is generated, the output of the AND gate 75a, therefore that of the OR gate 76a, becomes "1". Thus, the signal AVHR is generated. Further, after the signal −b disappears, the output of the OFF delay timer 77a connected to the output terminal of the AND gate 75a is maintained at the level "1" for the delay time of the OFF delay timer 77a.

The output of the OR gate 76a is supplied to the OFF delay timer 86a. Accordingly, the signal AVZHR is generated as shown in FIG. 6. The motor drive signal Qo is generated from the amplifier 146. The motor 22 starts to be driven in FIG. 1.

In FIG. 11, the signal AVHR is supplied to the set terminal $S_1$ of the flip-flop 89a. The $Q_1$ output thereof becomes "1". The Q output thereof becomes "0". Accordingly, the input to the data terminal D2 of the other flip-flop 89b, as shown in FIG. 6. The output of the OR gate 96, generates the signal AVH as shown in FIG. 6(S). The signal EVH becomes "0". However, the signal EAH continues to be "1", as shown in FIG. 6(U).

In FIG. 12, the signal AVHR is supplied to the set terminals of the flip-flop 202b. The Q output thereof becomes "1", and it is supplied to the one input terminals of the AND gates 204b and 212b. The input signal EVH is supplied to the other input terminal of the AND gate 204b and is "0", while the input signal AVH is supplied to the other input terminal of the AND gate 212b and is "1". Accordingly, the output of the AND gate 204b remains "0", while that of the AND gate 212b becomes "1". The output signal AV is obtained. Thus, the control signal Sa of the current level "1" is supplied to the solenoid portion 30a of the change-over valve 4a in FIG. 1. Thus, the brakes of the right front wheel 6a and rear wheels 11b are relieved. The Q output of the one flip-flop 202b is "1", while that of the other flip-flop 202a is "0". Now the right side of the road is judged to be "low side" by that fact.

At time t4, the other rear wheel 11b reaches the predetermined slip during the continuation of the signal AVHR as shown in FIG. 6(C). Thus, the signal AVHL is generated as shown in FIG. 6(F). In FIG. 11, the signal AVHL is supplied to the set terminal S2 of the flip-flop 89b. Accordingly, the $Q_2$ output thereof becomes "1" and the $\overline{Q}_2$ output thereof becomes "0". Thus, the input to the data terminal D1 of the flip-flop 89a becomes "0" as shown in FIG. 6(I).

The signal AVHL is also supplied to the one input terminal of the OR gate 96. Since the signal AVHR continues to be supplied to the other input terminal of the OR gate 96, the signal AVH remains "1". In FIG. 12, the signal AVHL is supplied to the set terminal S of the flip-flop 202a. However, since the Q output of the flip-flop 202b is supplied through the OR gate 206a to the reset terminal R of the flip-flop 202a, the Q output of the flip-flop 202a remains "0" due to the reset priority. Thus, the output of the AND gate 212a remains "0". The output signal AV for the left side is not generated. The brake of the left front wheel 6b is not relieved. However, when the left front wheel 6b generates the signal AVVL, it is independently controlled for brake relief, since the signal AVVL is supplied to the OR gate 211a. Thus, the braking distance can be greatly shortened with the arrangement of this embodiment of the invention.

At time t5, the signal AVHL becomes "0". However, the signal AVHL has no influence on the other signals.

At time t6, the slip signal λ of the right rear wheel 11a disappears. Accordingly, the signal AVHR becomes "0" as shown in FIG. 6(C). In FIG. 2, the input to the one input terminal of the OR gate 85a becomes "0". However, after the signal −b disappears, the output of the OR gate 82a is still "1" because of the delay time of the OFF delay timer 77a. Accordingly, as a result of the output of the AND gate 84a, the signal EVHR becomes again "1". With the disappearance of the signal AVHR, the output of the OR gate 85a, therefore the signal EAHR continues to be "1" as shown in FIG. 6(A).

In FIG. 11, the signal AVHR becomes "0". However, since the output of the OR gate 91a is still "0", the flip-flop 89a is not reset, but the Q output thereof remains "1" as shown in FIG. 6(L). The signal EVHR is still "1". Accordingly, the output "a" of the AND gate 90a remains "1", as shown FIG. 6(0). The output "e" of the OR gate 96 becomes "0". Accordingly, the output "f" of the AND gate 95, therefore the signal EVH, becomes again "1" from "0" as shown in FIG. 6(T). The output signal EAH of the OR gate 97 remains "1".

In FIG. 12, the input to the set terminal S of the flip-flop 202b becomes "0". However, since the input to the reset terminal R thereof is "0", the Q output thereof remains "1". Since the signal EVH becomes again "1", the output of the AND gate 204b, and therefore that of the OR gate 209b, becomes "1". On the other hand, the input AVH to the one input terminal of the AND gate 212b becomes "0".

Accordingly, the output thereof becomes "0", and the output signal AV disappears. With the disappearance of the output signal AV, the other output signal EV becomes "1". In FIG. 1, the change-over valve 4a is changed over to the position B, and the braking forces to the right front wheel 6a and the rear wheels 11b are maintained at constant.

In FIG. 2, when the deceleration signal $-b$ disappears, and the delay time of the OFF delay timer 131a lapses, the input to the fourth input terminal of the OR gate 82a becomes "0". However, it is assumed that the left rear wheel 11b reaches the predetermined first acceleration before the lapse of the delay time of the OFF delay timer 77a. Accordingly, the input to the first input terminal of the OR gate 82a becomes "1", and the signal EAHL continues to be "1" as shown in FIG. 6(D), as long as the first acceleration signal $+b_1$ is generated, although the output of the OFF delay timer 77a becomes "0". At time t7 when the first acceleration signal $+b_1$ disappears, the signal EAHL becomes "0".

In FIG. 11, the input to the clock terminal C2 of the flip-flop 89b becomes "0". It is inverted or negated and supplied to the clock terminal C2. The input "0" is supplied to the data terminal D2, and it is read out with the negated input to the clock terminal C2. Thus, the Q2 output becomes "0" as shown in FIG. 6(N). Accordingly, the Q2 output becomes Accordingly, the output "b" of the AND gate 92 remains "0". The output "c" of the AND gate 90a becomes "0" with the disappearance of the Q2 output of the flip-flop 89b, as shown in FIG. 6(Q).

On the other hand, the Q1 output of the flip-flop 89a remains "1", and the right rear wheel 11a still generates the signal EVHR. Accordingly, the output "a" of the AND gate 90a continues to be "1", and the signal EVH remains "1" as shown in FIG. 6(T).

In FIG. 2, as soon as the first acceleration signal $+b$ disappears, the pulse generator 80a is driven for the delay time of the OFF delay timer 79a. The signal EAHL and EAHL are cycled between "0" and "1" as shown in FIG. 6(D), from time t8. In FIG. 11, the one input to the OR gate 93 and the one input to the AND gate 90b are cycled between "0" and "1". However, the Q2 output of the one flip-flop 89b is "0", and the Q1 output of the other flip-flop 89a is "0". Accordingly, the output EAH of the OR gate 97, and the output EVH of the AND gate 95 are not cycled between "0" and "1", but they continue to be "1" with the signal EVHR. Accordingly, the braking forces to the right front wheel 6a and rear wheels 11a and 11b are still maintained at constant.

When the right rear wheel 11a generates the first acceleration signal $+b$, after time t7, the signals EVHR and EAHR continue to be "1" through the delay time of the OFF delay timer 77a. The braking forces to the right front wheel 6a and rear wheels 11a and 11b are still maintained at constant. However, at time t8 when the first acceleration signal $+b_1$ disappears, the pulse generator 80a is driven, and the signal EAHR are cycled between "0" and "1" as shown in FIG. 6(A). Thus, in FIG. 11, the signals EVH and EAH are cycled between "0" and "1". Accordingly, in FIG. 11, the output of the AND gate 204b are cycled between "0" and "1". The braking force to the right front wheel 6a and rear wheels 11b are stepwisely increased.

When the counted pulses reach the predetermined value, the output CEHR of the counter 88a (in FIG. 2) in the judge circuit for the right rear wheel 11a becomes "1". Accordingly, in FIG. 11, the input of the third input terminal of the OR gate 206b becomes "1". The output of the OR gate 206b is supplied to the reset terminal R of the flip-flop 202b to reset the flip-flop 202b. The Q output thereof becomes "0". Although the pulses continue, the stepwise increase of the braking forces is stopped. When the Q output of the flip-flop 202b becomes "0", the other flip-flop 202a is released from the reset condition.

Hereafter, if the right side of the road is still "low side", the above operations are similarly repeated. When the "low side" is inverted on the road, or when the left side of the road becomes "low side", operations similar to the above described operations for the right front wheel 6a and left rear wheels 11b are effected for the left front wheel 6b and right rear wheels 11a.

Further, the "low side" is so designed as to be reset both of the braking forces to the front and rear wheels 6a and 11a, are stepwisely increased. In FIG. 12, the signals PLVR and PLHR (outputs of the pulse generators 80a) are changed as "1", "0", "1". The output of the AND gate 213b, therefore and, that of the OR gate 206b becomes "1", and it is supplied to the reset terminal R of the flip-flop 202b. The Q output thereof becomes "0". Accordingly, the output of the OR gate 206a becomes "0", and the input to the reset terminal R of the flip-flop 202a becomes "0". When the signal AVHL is hereafter supplied to the set terminal of the flip-flop 202a, the Q output thereof becomes "1". Thus, the "low side" is changed over.

According to a first modification of this embodiment, the low side is so designed to be reset in the case that the rear wheel 11a on the low side is rapidly accelerated and so generates the second acceleration signal $+b_2HR$, or that the brake reducing signal AVHR of the rear wheel 11a on the low side disappears for a longer time than a predetermined time.

Figure 14:
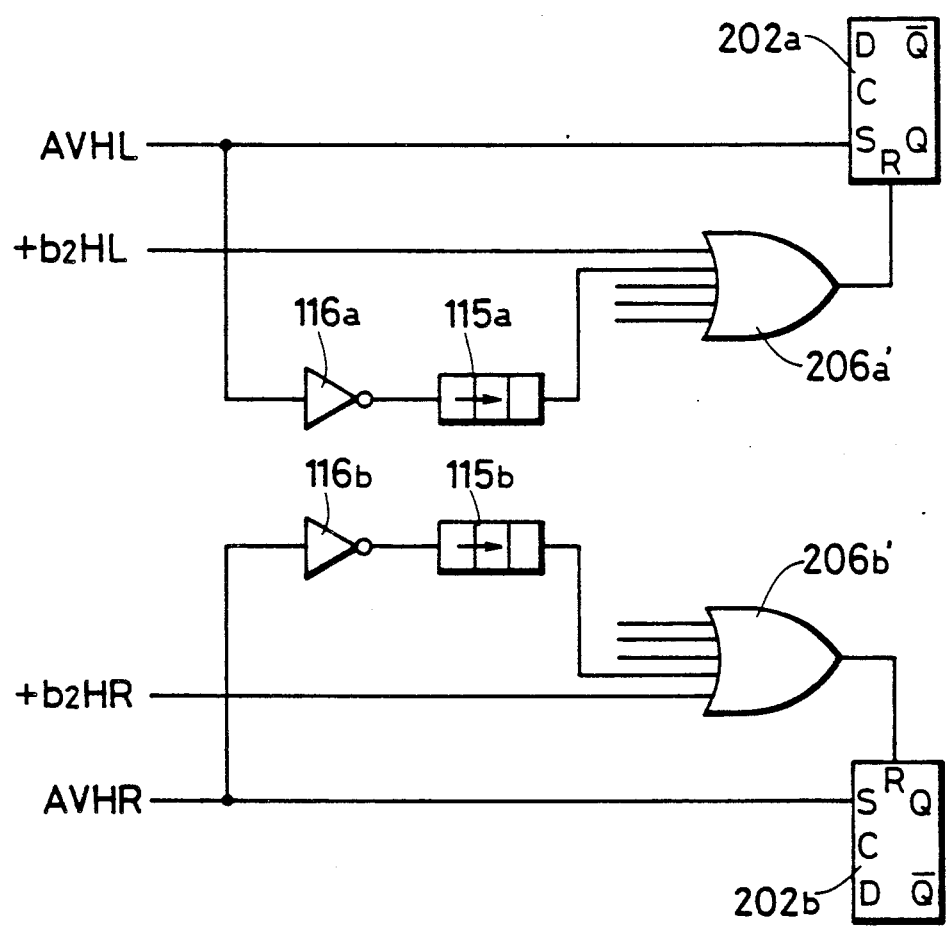
FIG. 14 is a circuit diagram of a part of a first modification of the logic circuit of FIG. 12.

FIG. 14 shows the first modification. The other circuits are the same as the circuit of FIG. 12. In FIG. 14, the output signals AVHL and AVHR are supplied to NOT gates 116a and 116b. The output signals $+b_2HL$ and $+b_2HR$ are supplied to fifth input terminals of OR gates 206a' and 206b', which correspond to the OR gates 206a and 206b of FIG. 12. Output terminals of the NOT gates 116a and 116b are connected through ON delay timers 115a and 115b to fourth input terminals of the OR gates 206a' and 206b'. In the circuit of FIG. 14, when the rear wheel 11a on the low side is rapidly accelerated and so generates the second acceleration signal $+b_2HR$, the output of the OR gate 206b' becomes "1" and the flip-flop 202b is reset. Thus, the low side is reset.

When the brake relieving signal AVHR of the rear wheel 11a on the low side disappears continuously for longer time than the delay time of the ON delay timer 115b, the output of the ON delay timer 115b becomes "1". Accordingly, the output of the OR gate 206b' becomes "1" and so the flip-flop 202b is reset. Thus, the low side is reset.

According to a second modification of this embodiment, when the rear wheel 11a on the low side is rotating continuously for a longer time than a predetermined time in the stable region of the μ-slip characteristics, the low side is reset. The side which first generates the brake maintaining signal, or brake relieving signal than the other side, is newly made "low side". That can be effected with the circuit of FIG. 15, which is added to the circuit of FIG. 12.

Figure 15:
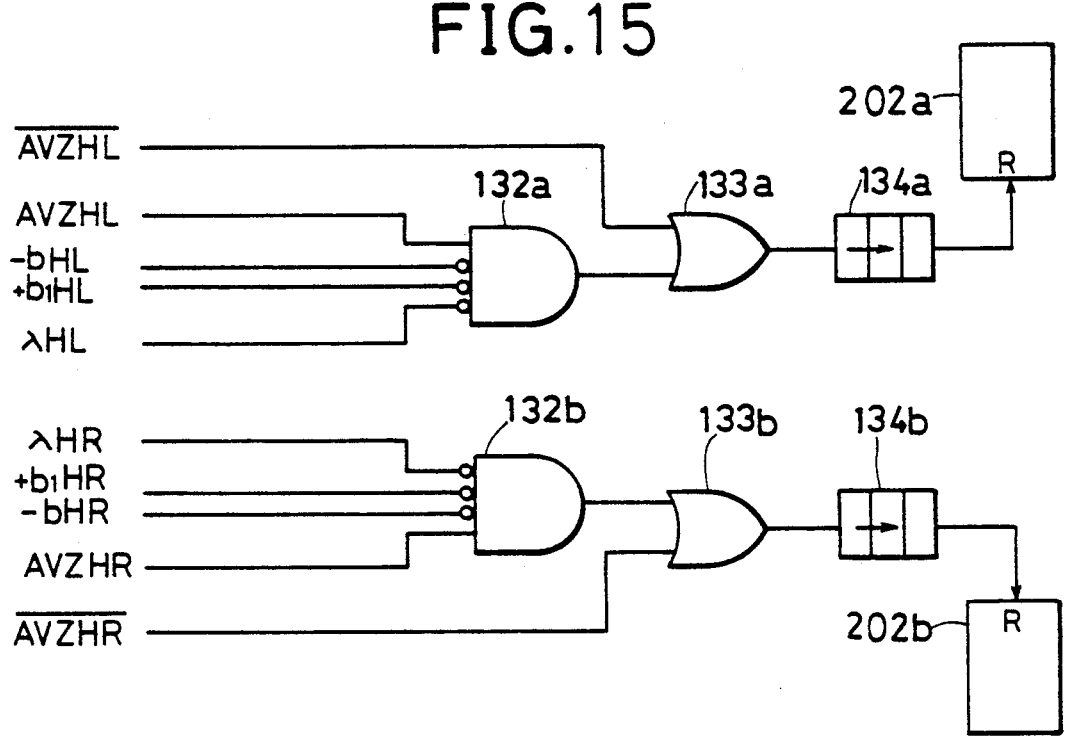
FIG. 15 is a circuit diagram of a part of a second modification of the logic circuit of FIG. 12.

In FIG. 15, the signals AVZHL and AVZHR are supplied to first input terminals of AND gates 132a and 132b. Further, the signals λHL, λHR, +b₁HL, +b₁HR and −bHL, −bHR are supplied to second, third and fourth negation input terminals of the AND gates 132a and 132b. Output terminals of the AND gates 132a and 132b are connected to one input terminals of OR gates 133a and 133b. The signals AVZHL and AVZHR are supplied to the other input terminals of the OR gates 132a and 132b. Output terminals of the OR gates 133a and 133b are connected through ON delay timers 134a and 134b to the reset terminals of the flip-flops 202a and 202b of FIG. 12.

When the rear wheel on the low side is rotating continuously in the stable region of the μ-slip characteristics for a longer time than the delay time of the ON delay timers 134a and 134b, the flip-flops 202a and 202b are reset, and put into the initial condition. Thus, the low side is reset. The side of the rear wheel which first generates the brake maintaining signal or brake relieving signal, is newly designated the "low side". Hereafter, the above described operations are effected.

The definition of "the stable region of the μ-slip characteristics" is described, for example, in "The Society of Automobile Technology", page 133, no. 31, 1985. The "stable region" means that the wheel is rotating at smaller slip rates than the slip rate at the maximum of μ-value (frictional value) in the slip rate-frictional coefficient μ characteristics. According to this modification, the case of no occurrence of either the slip signal, the first acceleration signal +b, or the deceleration signal −b, is used as the certain "stable region".

In this embodiment, the front and rear wheels on the low side is considered to be in the stable region of the μ-slip characteristics, also when they are stepwisely braked, as described with reference to FIG. 12.

According to a third modification, when the rear wheel on the low side generates continuously the brake increasing signal for a long time than a predetermined time, the low side is reset. The side of the rear wheel which first generates the brake maintaining signal or brake relieving signal, is newly designated the "low side". That can be effected with the circuit of FIG. 16.

Figure 16:
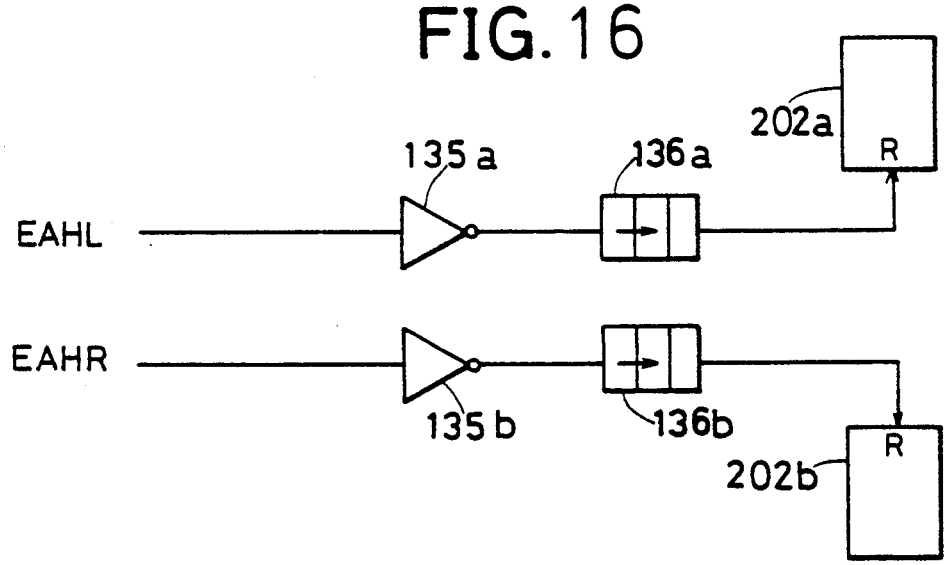
FIG. 16 is a circuit diagram of a part to a third modification of the logic circuit of FIG. 12.

In FIG. 16, the signals EAHL and EAHR are supplied to NOT gates 135a and 135b. Output terminals of the NOT gates 135a and 135b are connected through ON delay timers 136a and 136b to the reset terminals R of the flip-flops 202a and 202b.

When the rear wheel on the low side generates continuously the brake increasing signal for a longer time than the delay time of the ON delay timers 136a or 136b, the flip-flop 202a or 202b is reset and put into the initial condition. And it is newly judged which side of the road is "low side". Other parts are the same as the circuit of FIG. 12.

According to the first modification, as described with reference to FIG. 16, the low side is reset in the case that the brake relieving signal AVHR of the rear wheel 11a on the low side disappears for longer than the predetermined time. The above described predetermined time is made the delay time set in the ON delay timers 115a and 115b, in the first modification.

However, the predetermined time may be changed in accordance with the generating time of the brake relieving signal of the rear wheel 11a on the low side in the last control cycle.

Figure 17:
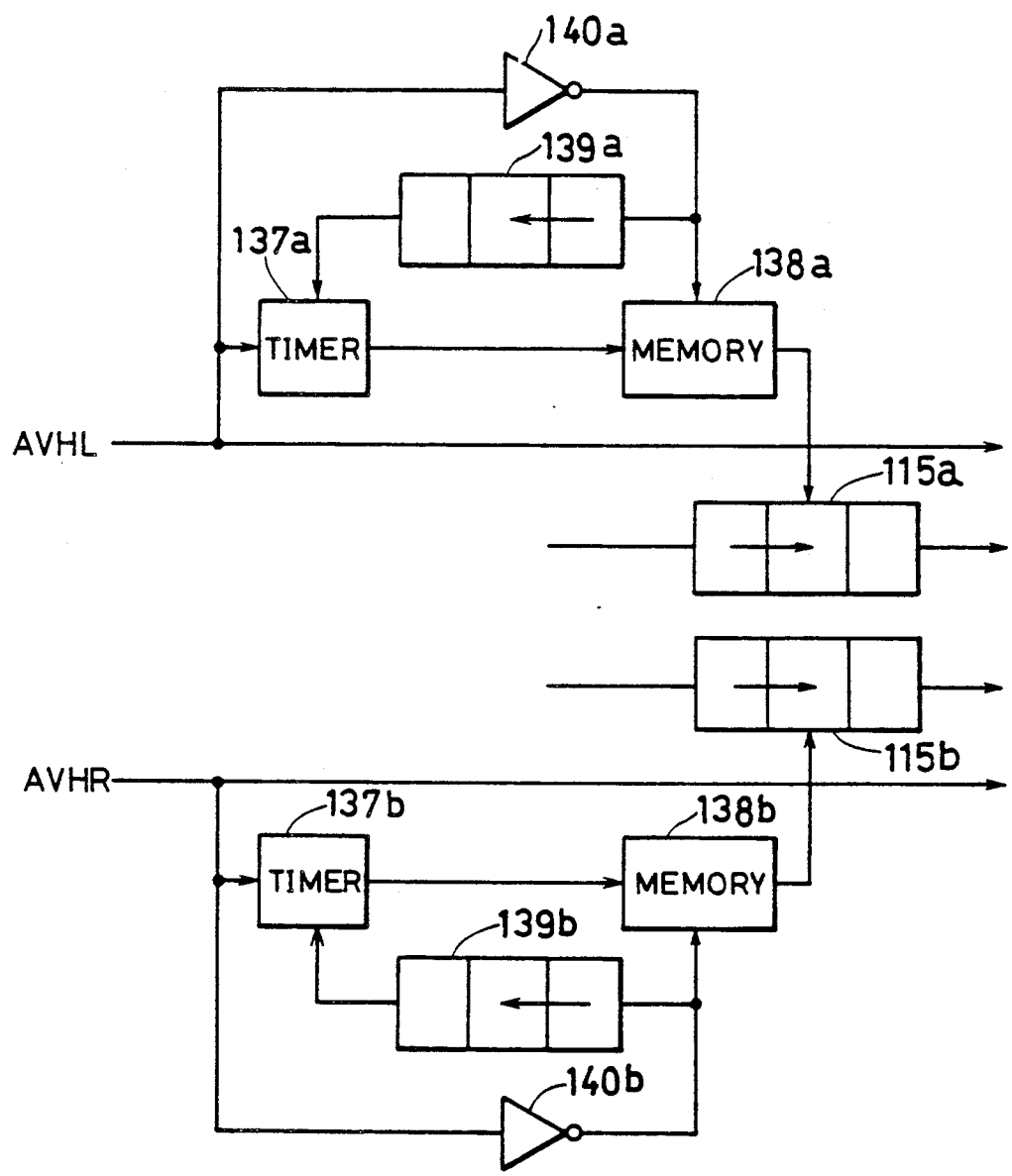
FIG. 17 is a circuit diagram of a part of a fourth modification of the logic circuit of FIG. 12.

FIG. 17 shows such a fourth modification of this embodiment. Other parts are the same as the circuit of FIG. 12 and FIG. 14. In this modification, timers 137a and 137b, memories 138a and 138b, second ON delay timers 139a and 139b, and NOT gates 140a and 140b are added to the circuits of FIG. 12 and FIG. 16.

In the last control cycle, the timer 137b operates with the generation of the brake relieving signal AVHR of the rear wheel 11a on the low side. The generating time of the signal AVHR is measured by the timer 137b. When the signal AVHR disappears, the output of the NOT gate 140b becomes "1", and it is supplied to the memory 138b. Thus, the measurement result is transferred to the memory 138b, and is retained there. The output of the ON delay timer 139b becomes "1" in the delay time of the ON delay timer 139b after the output of the NOT gate 140b becomes "1". The measurement time set in the timer 137b is erased with the output of the ON delay timer 139a. The timer signal retained in the memory 138b is supplied to the ON delay timer 115b. The delay time proportional to the time signal is set in the ON delay timer 115b.

Figure 18:
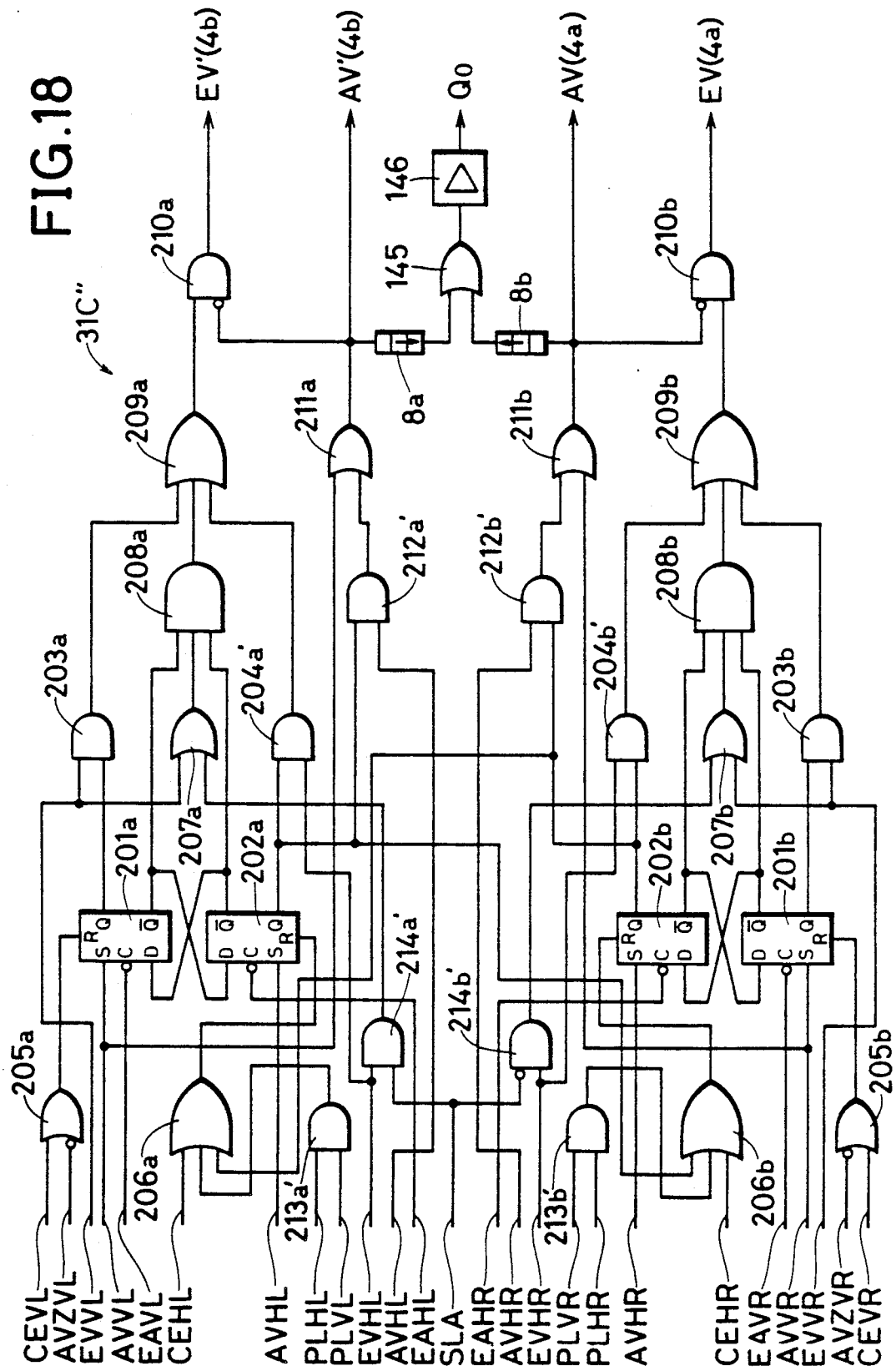
FIG. 18 is a circuit diagram of a logic part 31C'' in a control unit 31, in an anti-skid control apparatus according to a fourth embodiment of this invention.

FIG. 18 shows a circuit of a logic part 31C" of a control unit according to a fourth embodiment of this invention. In this embodiment, a judge part of the control unit is the same as that of the first embodiment. In a selection part of the control unit, except for the circuit for generating the SLA signal, or the low side discrimination part, are omitted. The conduit system is the same as that of the first embodiment.

In the third embodiment, the first select-low control signal is formed from the judging or measuring results of the skid conditions of the rear wheels 11a and 11b and the second select-low control signal is formed from the first select-low control signal and the judge result of the front wheel on the low side. On the other hand, in this embodiment a select-low control signal is formed from the judging result of the front and rear wheels on the low side.

Next, the circuit of FIG. 18 will be described in more detail. Parts in FIG. 18 which correspond to those in FIG. 12, are denoted by the same reference numerals, the description of which will be omitted.

In this embodiment, instead of the output signals EVH, AVH and EAH (the first select-low control signals) of the selection part 31B of the third embodiment, the output signals EVHL, AVHL, EAHL, EVHR, AVHR and EAHR as the judge results of the rear wheels 11a and 11b in the judge part 31A are supplied to the logic part 31C". The output EVHL and EVHR are supplied to one input terminal of the AND gates 213a' and 214b'. The output SLA is supplied to one other input terminal thereof and a negation input terminal thereof. Further, the output signals EVHL and EVHR are supplied to one input terminals of the AND gates 204a' and 204b'. Q output terminals of the flip-flops 202a and 202b are connected to other input terminals thereof. The output AVHL and AVHR are supplied to one input terminal of the AND gates 212a' and 212b'. Output terminals of the flip-flops 202a and 202b connected to other input terminals thereof. The output EAHL and EAHR are supplied to the negation clock input terminals of the flip-flops 202a and 202b, respectively.

This embodiment is so constructed as above described. In the description of the operations, the select-low control signals EVH, AVH and EAH of the rear wheels 11a and 11b in the third embodiment are substituted with the outputs EVHL, AVHL, EAHL or EVHR, AVHR, EAHR of the rear wheels on the low side. The description of the operation will be omitted here.

While the preferred embodiment has been described, variations thereto will occur to those skilled in the art within the scope of the present inventive concepts which are delineated by the forthcoming claims.

For example, according to the circuit (FIG. 15) of the second modification of the third embodiment, the "low side" is reset in the case that the rear wheel 11a on the "low side" has rotated in the stable region or condition of the "$\mu$-slip characteristics" for longer than the predetermined time. Likewise, the "low side" may be reset in the case that the slip of the rear and/or front wheel on the "high side" becomes higher than a second predetermined slip which is lower than the predetermined slip for generating the brake relieving signal, while the rear and/or front wheel on the "low side" is rotating in the stable region or condition of the "$\mu$-slip characteristics". Such a modification is effective for the vehicle's slalom running on a uniform high-$\mu$ road which is curving. The wheel speed of the wheel on the inside of the curve is lower, and accordingly, the inside of the curve corresponds to the "low side". When the slip of the wheel on the low side becomes higher than the second predetermined slip (smaller), it is preferable that the "low side" is changed over, before the brake relieving signal is generated from the wheel on the outside of the curve which runs, in turn, on the inside of the curve. Because the braking pressure of the front wheel running sequentially on the outside of the curve can be increased, and the over-steering can be prevented. The second predetermined slip rate is lower than the slip ratios $\lambda 1$ and $\lambda 2$ in FIG. 2. The anti-skid control operation has started. Accordingly, the motor drive signal Qo is generating. The wheels on the "low side" are in the stable region of the "$\mu$-slip characteristics". The logic can be formed under the above conditions.

Figure 19:
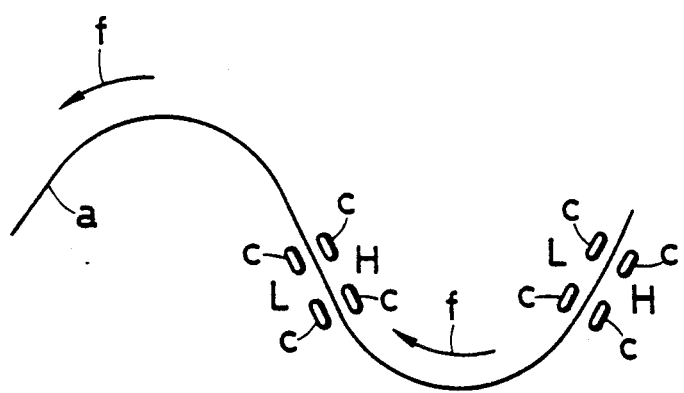
FIG. 19 is a chart for explaining one modification of the third embodiment.

The above is illustrated in FIG. 19. As shown in FIG. 19, the vehicle or automobile is running on the curving road in the direction shown by the arrow "f". The frictional coefficient is uniformly high in the curving road (H-$\mu$ road). The reference letters "C" represent the wheels. The inside of the curve is "low side" from the pressing relationship between the wheel and the road due to the centrifugal force. The outside of the curve is "high side". The reference letters "L" and "H" represent "low side" and "high side", respectively.

Thus, the braking pressure of the front wheel C which runs sequentially on the out-side of the curve, can be increased and so the over-steering can be prevented. Accordingly, this modification is effective for the so called "slalom drive" of the vehicle.

Further, in order to securely obtain the above effect, the low side may be reset in the case that the lateral acceleration is inverted and it becomes higher than a predetermined value, and that the slip of the front and/or rear wheel on the high side becomes higher than the second predetermined slip S1, while the front and/or rear wheel on the low side is rotating in the stable region of the $\mu$-slip characteristics.

In FIG. 8, the "low side" is changed over in the case that the other rear or front wheel on the high side generates continuously the brake relieving signal for a longer time than a predetermined time during the time when the brake relieving signal of the one rear or front wheel on the low side disappears. The predetermined time is the delay time set in the ON delay timer 315a. However, it may be changed in accordance with the continuation time of the brake relieving signal of the one rear wheel on the low side in the last control cycle.

When the one rear or front wheel on the low side has rotated continuously in the stable region of the $\mu$-slip characteristics for a longer time than a predetermined time, the side of the one rear or front wheel which generates the brake maintaining or relieving signal sooner than the other rear or front wheel, may be newly designated the "low side".

When the one rear or front wheel on the low side generates continuously the brake increasing signal for a longer time than a predetermined time, the side of the one rear or front wheel which generates the brake maintaining or relieving signal sooner that the other rear or front wheel, may be newly designated the "low side".

While any one of the rear wheels is rapidly accelerated beyond a predetermined acceleration threshold, the braking force to the low side may be rapidly increased.

The control unit may form a first select-low control signal on the basis of the measuring or judging results of the skid conditions of both the rear and front wheels and a second select-low control signal on the basis of the first select-low control signal and the measuring or judging result of the one front wheel on the low side, and, on the basis of the second select-low control signal, generate the instruction for controlling the first or second fluid pressure control valve device, and generate the instruction for controlling the second or first fluid pressure control valve device, on the basis of the measuring or judging result of the skid condition of the other front wheel running on the high side (frictionally higher side) independently of those of the rear wheels.

In the motor drive circuit shown in FIG. 5, the signals AV and AV' are supplied through the OFF delay timers 8a and 8b to the OR gate 145. Instead, the signals AVZVR, AVZHL, AVZVL and AVZHR may be connected directly to the OR gate 145.

In the first and second embodiments, the rear drive car has been described. Instead, a front drive car or a four-wheel drive (4WD) car may be applied to this invention.

Further, in the above embodiments, the braking force is also maintained at constant during the anti-skid control operations. However, the brake holding operation is not always needed.

Further, in the circuits of FIG. 14 to FIG. 17, the low side is reset on the basis of the judging result of the skid condition of the rear wheel on the low side. Instead, the low side may be reset on the basis of the judging result of the skid condition of the front wheel on the low side. Or it may be reset or the basis of the judging results of the skid conditions of the front and rear wheels on the low side.

In the embodiments of FIG. 12 and FIG. 18, when the number of the steps of the brake stepwisely increasing signal for the one rear wheel on the low side has reached a predetermined value, the low side is reset.

Instead, when the total of the brake increasing time of the brake stepwisely increasing signal for the one rear wheel on the low side has reached a predetermined time, the low side may be reset.

Further, in the above embodiments after said reset, the side of the one rear wheel which generates said brake maintaining signal sooner than the other rear wheel, is made "low side", before any one of said rear wheels generates said brake relieving signal.

Instead, after said reset, the side of the one front wheel which generates said brake maintaining signal sooner than the other front wheel, may be made "low side", before any one of said wheels generates said brake relieving signal.

Or, after said reset, the side of the one wheel which generates said brake maintaining signal soonest of the other wheels may be made "low side", before any one of all wheels generates said brake relieving signal.

Further, in the above embodiments after said reset, the side of the one rear wheel which generates said brake relieving signal sooner than the other rear wheel, is made "low side". Instead, after said reset, the side of the one front wheel which generates said brake relieving signal sooner than the other front wheel, may be designated the "low side". Or after said reset, the side of the one wheel which generates said brake relieving signal soonest of all wheels may be designated the "low side".

In the third and fourth embodiments, there have been described the various reset conditions for the low side. However, the low side may be reset in a predetermined time after said reset condition is fulfilled. Or said low side may be reset in the case that at least one of said reset conditions is fulfilled, and both of the rear wheels and the front wheel on the low side are not being accelerated. Or said low side may be reset in the case that at least one of said reset conditions is fulfilled, and the accelerations of both of the rear wheels and of the front wheel on the low side are lower than a predetermined acceleration threshold value.

In the above description, "have not been accelerated" means that the brake is maintained at constant, or that the brake is increased.

In the third and fourth embodiments, the valve apparatus shown in FIG. 10 is not used. However, it may be used in the conduit systems of these embodiments, respectively. It is connected between the wheel cylinders of the front and rear wheels.

Further, in the third and fourth embodiments, this invention is applied to the 4WD vehicle. This invention may be applied both to the 4WD vehicle of the part time type and to the 4WD vehicle of the full time type. Further, this invention may be applied also to the vehicle of the usual type such as, FF type (front engine, front drive), FR type (front engine, rear drive) and RR type (rear engine, rear drive) type. And further it may be applied to any other type of vehicles. Further in the above embodiments, the LSD (Limited Slip Differential) or viscous coupling are used as the lock apparatus or torque distribution mechanism. In the viscous coupling, two plates are rotated in silicon oil, and shearing force occurs between them. Instead, a lock apparatus of the well-known other type or different torque distribution mechanism may be used.

While the preferred embodiment has been described, variations thereto will occur to those skilled in the art within the scope of the present inventive concepts which are delineated by the following claims.

What is claimed is:

1. In an anti-skid control apparatus for a vehicle braking system including:
   (A) a pair of front wheels, and a pair of rear wheels;
   (B) wheel speed sensors associated with each of said wheels;
   (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
   (E) a control unit receiving outputs of said wheel speed sensors for judging the skid conditions of said front and rear wheels and for generating instructions for controlling said first and second fluid pressure control valve devices, the improvements in said control unit comprising:
   (i) a judging circuit for judging the skid conditions of said rear and front wheels on the basis of the outputs of said wheel speed sensors and thereby producing judging, results;
   (ii) a low-side discrimination circuit for discriminating which side of the road on which said wheels are running is frictionally lower from the judging results of said judging circuit with the road side determined to be frictionally lower designated as the "low side";
   (iii) a low side change-over means for changing the road side designated the "low side" over in accordance with said judging results at any time;
   (iv) a combining means for logically combining the judging results of skid conditions of said rear wheels; and
   (v) a logic control circuit for combining logically the output of said combining means with the judging result of the skid condition of the one front wheel running on the low side for generating the instruction for controlling said first or second fluid pressure control valve device for the corresponding front wheel, and for generating the instruction for controlling said second or first fluid pressure control valve device for the other front wheel on the basis of the judging result of the skid condition of the other front wheel running on the high side independently from the skid conditions of said rear wheels.

2. An anti-skid control apparatus according to claim 1, in which said judging results of the skid conditions from said judging circuit include a brake increasing signal, a brake holding signal, and a brake relieving signal, and wherein said low side discrimination circuit further comprises means for determining the road side having the one front or rear wheel which generates said brake maintaining signal sooner than the other front or rear wheel to be the "low side", the determination being made before any of said front and rear wheels generates said brake relieving signal.

3. An anti-skid control apparatus according to claim 1, wherein the judging results of the skid conditions from said judging circuit include a brake increasing signal, a brake holding signal, and a brake relieving signal, and wherein said low side discrimination circuit further comprises means for determining the road side having the one front or rear wheel which generates said brake relieving signal sooner than the other front or rear wheel to be the "low side".

4. An anti-skid control apparatus according to claim 1, wherein a valve apparatus for generating a fluid pressure in accordance with the lower one of the brake fluid pressures of said front wheels controlled with said first and second fluid pressure control valve devices is arranged between said wheel cylinders of the front wheels and those of the rear wheels.

5. In an anti-skid control apparatus for a vehicle braking system including:
   (A) a pair of front wheels, and a pair of rear wheels;
   (B) wheel speed sensors associated with each of said wheels;
   (C) a first fluid pressure control valve device for controlling the bake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
   (E) a control unit receiving outputs of said wheel speed sensors for judging the skid conditions of said front and rear wheels and for generating instructions for controlling said first and second fluid pressure control valve devices, the improvements in said control unit comprising:
     (i) a judging circuit for judging the skid conditions of said rear ad front wheels on the basis of the outputs of said wheel speed sensors and thereby producing judging results;
     (ii) a low-side discrimination circuit for discriminating which side of the road on which said wheels are running is frictionally lower from the judging results of said judging circuit with the road side determined to be frictionally lower designated as the "low side;"
     (iii) means for resetting the discrimination of which road side is the "low side" upon the fulfillment of a reset condition based on said judging results; and,
     (iv) a logic control circuit for combining logically the judging result of the skid condition of the one rear wheel running on the low side of the road with that of the one front wheel also running on the low side for generating the instruction for controlling said first or second fluid pressure control valve device for the corresponding front wheel, and for generating the instruction for controlling said second or first fluid pressure control valve device for the front wheel running on the high side on the basis of the judging result of the skid condition of the front wheel running on the high side independently from said rear wheels.

6. An anti-skid control apparatus according to claim 5, wherein said low-side discrimination circuit further comprises means, after being reset, for determining the side of the one front or rear wheel which generates said brake maintaining signal sooner than the other front or rear wheel to be the "low side", the determination being made before any one of front wheels or rear wheels generates said brake relieving signal.

7. An anti-skid control apparatus according to claim 5, wherein said low-side discrimination circuit further comprises means, after being reset, for determining the side of the one front or rear wheel which generates said brake relieving signal sooner than the other front or rear wheel to be "low side".

8. An anti-skid control apparatus according to claim 5, wherein said low-side discrimination circuit further comprises a reset circuit for resetting the determination of said "low side" in a predetermined time after a reset condition is fulfilled.

9. In an anti-skid control apparatus for a vehicle braking system including:
   (A) a pair front wheels, and a pair of rear wheels;
   (B) wheel speed sensors associated with each of said wheels;
   (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
   (E) a control unit receiving outputs of said wheel speed sensors for judging the skid conditions of said front and rear wheels and for generating instructions for controlling said first and second fluid pressure control valve devices, the improvements in said control unit comprising:
     (i) a judging circuit for judging the skid conditions of said rear and front wheels on the basis of the outputs of said wheel speed sensors to thereby produce judging results;
     (ii) a low-side discrimination circuit for discriminating which side of the road on which said wheels are running is frictionally lower from the judging results of said judging circuit with the road side determined to be frictionally lower designated as the "low side;"
     (iii) means for resetting the discrimination of which road side is the "low side" upon the fulfillment of a reset condition based on said judging results;
     (iv) a combining means for logically combining the judging results of skid conditions of said rear wheels; and
     (v) a logic control circuit for combining logically the output of said combining means with the judging result of the skid condition of the one front wheel running on the low side for generating the instruction for controlling said first or second fluid pressure control valve device for the corresponding front wheel, and for generating the instruction for controlling said second or first fluid pressure control valve device for the other front wheel on the basis of the judging result of the skid condition of the other front wheel running on the high side independently from the skid conditions of said rear wheels.

10. An anti-skid control apparatus according to claim 9, further comprising a valve apparatus for generating a fluid pressure in accordance with the lower one of the brake fluid pressures of said front wheels controlled with said first and second fluid pressure control valve devices, the valve apparatus being arranged between said wheel cylinders of the front wheels and said wheel cylinders of the rear wheels.

11. An anti-skid control apparatus according to claim 5 or 9, further comprising means for resetting the discrimination of which road side is the "low side" in the case that at least one of said front and rear wheels on the low side is rapidly accelerated beyond a predetermined acceleration threshold.

12. An anti-skid control apparatus according to claim 5, or 9, further comprising means for resetting the determination of which road side is the "low side" in the case that at least one of said front and rear wheels on the low side is rotating in the stable region of the $\mu$-slip characteristics.

13. An anti-skid control apparatus according to claim 12, wherein said low-side discrimination circuit further comprises a reset circuit for resetting the determination of said "low-side" in the case that a reset condition is fulfilled and both of the rear wheels and the front wheel on the low side are not being accelerated.

14. An anti-skid control apparatus according to claim 12, wherein said low-side discrimination circuit further comprises a reset circuit for resetting the determination of said "low side" in the case that at least one of said reset conditions is fulfilled, and the accelerations of both of the rear wheels and of the front wheel on the low side are lower than a predetermined acceleration threshold value.

15. An anti-skid control apparatus according to claim 5 or 9, further comprising means for resetting the discrimination of which road side is the "low side" in the case that at least one of said front and rear wheels on the low side has rotated continuously in the stable region of the $\mu$-slip characteristics for a predetermined time.

16. An anti-skid control apparatus according to claim 15 further comprising means for changing said predetermined time in accordance with the continuation time of said brake relieving signal of at least one of said front and rear wheels on the low side in the last control cycle.

17. An anti-skid control apparatus according to claim 16, wherein said low side discrimination circuit further comprises means for determining, after said reset, the side of the one front or rear wheel which generates said brake maintaining signal sooner than the other front or rear wheel to be the "low side" before any one of the front wheels or rear wheels generates said brake relieving signal.

18. An anti-skid control apparatus according to claim 16, further comprising means for changing said predetermined time in accordance with the continuation time of said brake relieving signal of at least one of said front and rear wheels on the low side in the last control cycle.

19. An anti-skid control apparatus according to claim 16, further comprising means for changing said predetermined time in accordance with the continuation time of said brake relieving signal obtained from the result of the select-low calculation of said rear wheels.

20. An anti-skid control apparatus according to claim 5 or 9, further comprising means for resetting the discrimination of which road side is the low side in the case that the brake relieving signal of at least one of said front and rear wheels on the low side has disappeared continuously for a predetermined time.

21. An anti-skid control apparatus according to claim 5 or 9, wherein the judging results of the skid conditions from said judging circuit further includes a brake stepwisely increasing signal, and further comprising means for resetting the discrimination of which road side is the "low side" when the number of the steps of said brake stepwisely increasing signal for at least one of said front or rear wheels on the low side has reached a predetermined value.

22. An anti-skid control apparatus according to claim 5 or 9, wherein the judging results of the skid conditions from said judging circuit further includes a brake stepwisely increasing signal, and further comprising means for resetting the discrimination of which road side is the "low side" when the total of the brake increasing time of said brake stepwisely increasing signal for at least one of said front and rear wheels on the low side has reached a predetermined value.

23. An anti-skid control apparatus according to claim 5 or 9, further comprising means for resetting the discrimination of which road side is the "low side" when at least one of said one front and/or rear wheels on the low side generates continuously the brake increasing signal for a predetermined time.

24. An anti-skid control apparatus according to claim 5 or 9, further comprising a lateral acceleration detector for detecting the lateral acceleration of the vehicle body, and means for resetting the discrimination of which road side is the "low-side" in the case that the lateral acceleration is reversed during the time when at least one of said front and rear wheels on the low side is rotating on the stable region of the $\mu$-slip characteristics.

25. An anti-skid control apparatus according to claim 5 or 9, further comprising a lateral acceleration detector for detecting the lateral acceleration of the vehicle body, and also further comprising means for resetting the discrimination of which road side is the "low side" in the case that the lateral acceleration is reversed, and becomes higher than a predetermined value during the time when at least one of said front and rear wheels on the low side is rotating in the stable region of the $\mu$-slip characteristics.

* * * * *